United States Patent [19]

Satoh

[11] Patent Number: 5,499,327
[45] Date of Patent: Mar. 12, 1996

[54] MULTI-WINDOW SYSTEM WHICH CAN OVERLAY-DISPLAY A DYNAMIC IMAGE IN A SPECIFIC WINDOW

[75] Inventor: Makoto Satoh, Tokyo, Japan

[73] Assignee: Canon Kabushiki Kaisha, Tokyo, Japan

[21] Appl. No.: 5,158

[22] Filed: Jan. 15, 1993

[30] Foreign Application Priority Data

Jan. 20, 1992 [JP] Japan ................................. 4-007440
Apr. 10, 1992 [JP] Japan ................................. 4-091120

[51] Int. Cl.$^6$ .................................................. G06T 3/00
[52] U.S. Cl. ................................. 395/135; 395/157
[58] Field of Search ............................. 395/133, 135, 395/119, 121, 122, 125, 144, 147, 155, 157, 158, 160, 161; 340/703; 358/22; 345/120; 379/53, 54

[56] References Cited

U.S. PATENT DOCUMENTS

| 4,357,624 | 11/1982 | Greenberg | 358/22 |
| 4,559,533 | 12/1985 | Bass et al. | 345/120 |
| 4,819,189 | 4/1989 | Kikuchi et al. | 395/158 |
| 4,954,970 | 9/1990 | Walker et al. | 340/703 X |
| 5,179,642 | 1/1993 | Komatsu | 395/135 |

*Primary Examiner*—Almis R. Jankus
*Attorney, Agent, or Firm*—Fitzpatrick, Cella, Harper & Scinto

[57] ABSTRACT

In an image processing system of this invention, bit information indicating whether or not a dynamic image is to be overlay-displayed is stored in a memory in correspondence with display pixel positions, and an output image memory control unit reads out this bit information in synchronism with a screen display operation. An overlay processing unit alternatively selects specific input dynamic image signals to be window-displayed in units of display regions, and an image signal of an output image memory, which signal is displayed on another region on the basis of the bit information.

18 Claims, 24 Drawing Sheets

|  | 6 | 5 4 | 3 2 | 1 0 |
|---|---|---|---|---|
| OVERLAY-DISPLAY MODIFICATION REGISTER #0 | 0 | 01 | | 1000 |
| OVERLAY-DISPLAY MODIFICATION REGISTER #1 | 1 | 00 | | 0000 |

OUTPUT IMAGE PIXEL NUMBER

| LINE NUMBER | 0 | 3132 | 6364 | k | 991 | 992 | 1023 |
|---|---|---|---|---|---|---|---|
| 0 | 0 | 1 | | k/32 | | | 31 |
| 1 | 32 | 33 | | 32+[k/32] | | | 63 |
| 2 | 64 | 65 | | 64+[k/32] | | | 95 |
| 3 | | | | | | | |
| j-1 | | | | | | | |
| j | 32xj | 32xj+1 | | 32xj+[k/32] | | | 32xj+31 |
| j+1 | | | | | | | |
| 766 | 24512 | 24511 | | 24512+[k/32] | | | 24543 |
| 767 | 24544 | 24545 | | 24544+[k/32] | | | 24575 |

FIG. 12

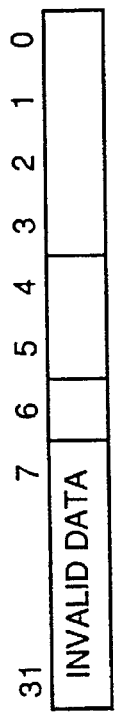

Bits 31–7: INVALID DATA

Bit 6: OVERLAY-DISPLAY MASTER IMAGE SELECTION
- 0 : INPUT DYNAMIC IMAGE PIXEL DATA SIGNAL 7a
- 1 : INPUT DYNAMIC IMAGE PIXEL DATA SIGNAL 7b

Bits 5–4: OVERLAY-DISPLAY BACKGROUND IMAGE SELECTION
- 00 : ACHROMATIC (BLACK) IMAGE
- 01 : OUTPUT IMAGE PIXEL DATA SIGNAL 9
- 10 : INPUT DYNAMIC IMAGE PIXEL DATA SIGNAL 7a
- 11 : INPUT DYNAMIC IMAGE PIXEL DATA SIGNAL 7b Bits 3–0: BACKGROUND IMAGE MIXING RATIO
- 0000 : 0/16 BACKGROUND IMAGE + 16/16 MASTER IMAGE
- 0001 : 1/16 BACKGROUND IMAGE + 15/16 MASTER IMAGE
- m : m/16 BACKGROUND IMAGE + (16−m)/16 MASTER IMAGE
- 1111 : 15/16 BACKGROUND IMAGE + 1/16 MASTER IMAGE FIG. 14A
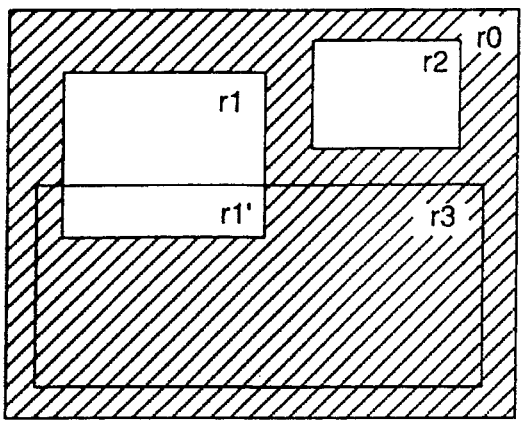
FIG. 14C
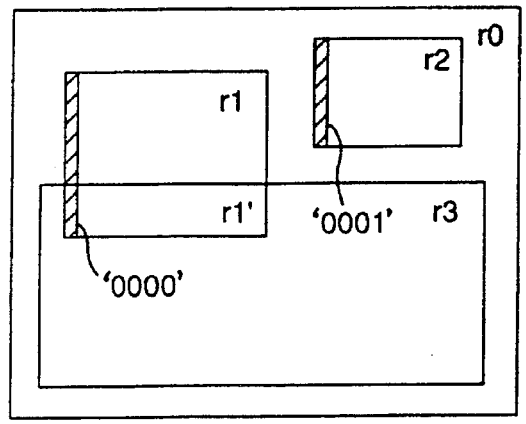
FIG. 14B
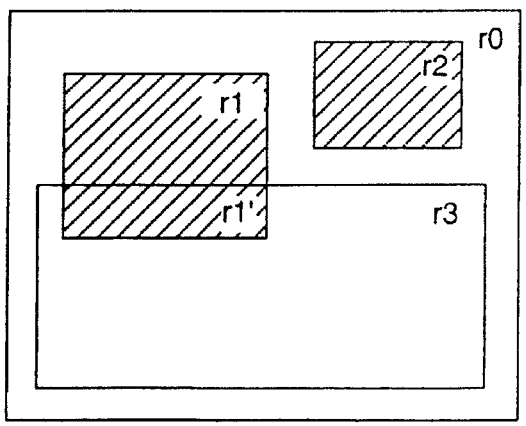
FIG. 14D
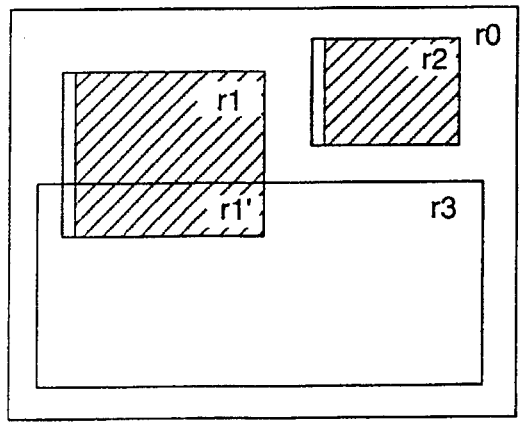
FIG. 14E
| | 6 | 5 4 | 3 2 1 0 |
|---|---|---|---|
| OVERLAY-DISPLAY MODIFICATION REGISTER #0 | 0 | 00 | 0000 |
| OVERLAY-DISPLAY MODIFICATION REGISTER #1 | 1 | 00 | 0000 |

FIG. 16A
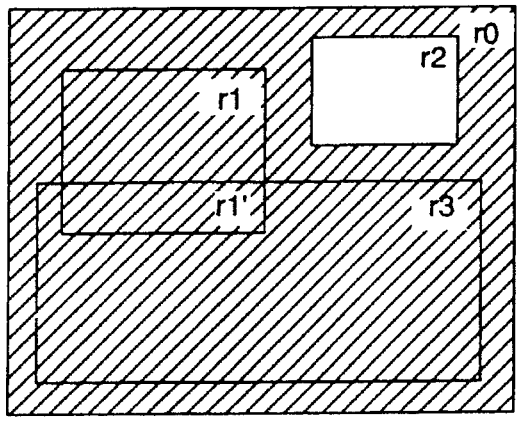
FIG. 16C
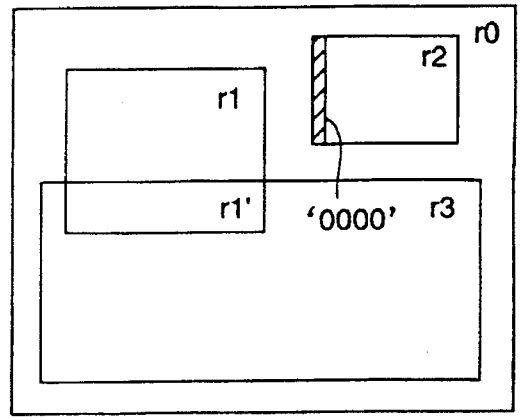
FIG. 16B
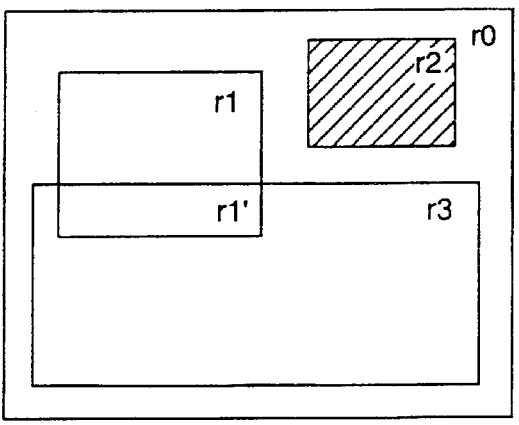
FIG. 16D
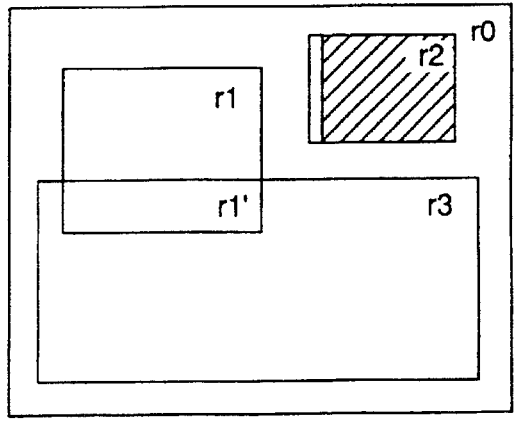
FIG. 16E
| | 6 | 5 4 | 3 2 1 0 |
|---|---|---|---|
| OVERLAY-DISPLAY MODIFICATION REGISTER #0 | 0 | 00 | 0000 |
| OVERLAY-DISPLAY MODIFICATION REGISTER #1 | 1 | 00 | 0000 |

FIG. 18A
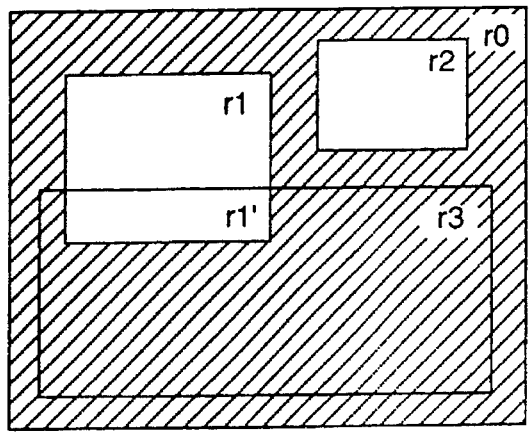
FIG. 18C
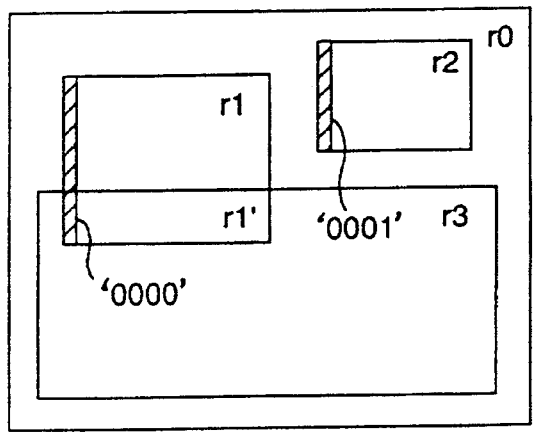
FIG. 18B
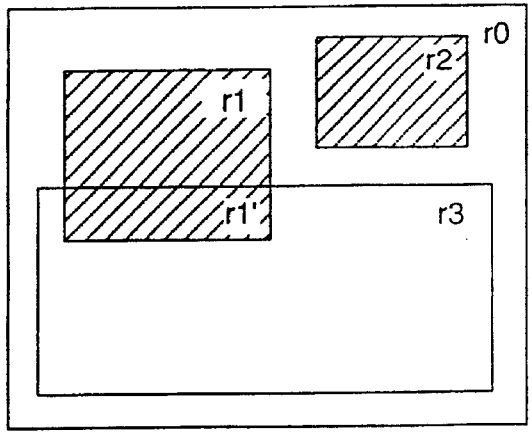
FIG. 18D
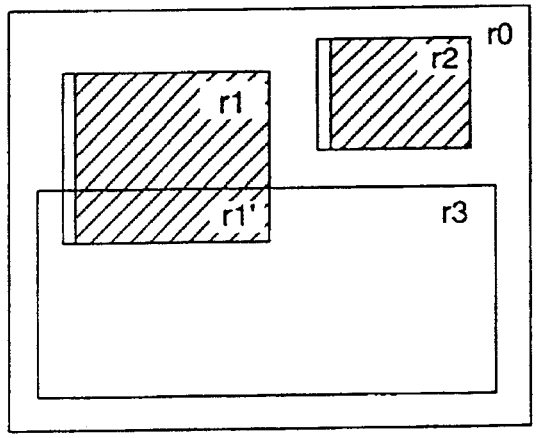
FIG. 18E
| | 6 | 5 4 | 3 2 1 0 |
|---|---|---|---|
| OVERLAY-DISPLAY MODIFICATION REGISTER #0 | 0 | 01 | 1000 |
| OVERLAY-DISPLAY MODIFICATION REGISTER #1 | 1 | 00 | 0000 |

MULTI-WINDOW SYSTEM WHICH CAN OVERLAY-DISPLAY A DYNAMIC IMAGE IN A SPECIFIC WINDOW

FIELD OF THE INVENTION

The present invention relates to an image processing system suitable for a personal computer or work station, or a multi-media terminal represented by a TV telephone set, which loads a so-called multi-window system for divisionally displaying a plurality of images on an image display apparatus and, more particularly, to an image processing system and an image processing method, which can overlay-display a dynamic image on a specific window.

BACKGROUND OF THE INVENTION

In recent years, multi-window systems are popular in personal computers and work stations.

Specific display regions on the display screen of a single image display apparatus are respectively assigned to a plurality of application programs on the multi-window system. Furthermore, an OS (operating system) of the multi-window system executes processing for opening/closing a file, and processing for opening or closing image processing associated with the plurality of display regions, i.e., "windows" so as to start/end a process according to a request from an application program executed by a personal computer.

In a general multi-window system, a window interface with a user operating a system (i.e., a window selected by the user) is processed as an active window, and is displayed at the top position of a plurality of windows. Therefore, the entire display region of the active window is displayed. The display regions of some windows other than the active window are often locally concealed under other windows. The OS of the multi-window system performs overlay-display control, i.e., hierarchical display control of the windows in addition to the basic open/close control of the windows.

In most personal computers and work stations, which load multi-window systems, pixel data is stored in a single bit-map output image memory, and is displayed on the screen of an image display apparatus. For this reason, exclusive display control of portions concealed under other windows is normally only executed by the OS of the multi-window system.

In recent years, as representative multi-media information, personal computers, which process dynamic images, and systems called multi-media terminals have become available. Various methods of overlay-displaying a dynamic image on a given window in these image processing apparatuses which load the multi-window systems have been proposed. In most of these methods, a special pixel data pattern for overlay-display of a dynamic image is predetermined, and a portion inside the window to be subjected to the overlay-display is painted by the pixel data pattern.

Furthermore, in a multi-media terminal, which loads an application of a television (TV) telephone, when two dynamic image sources, i.e., its own dynamic image (own image) and a dynamic image (received image) sent from a terminal on the other end of a line are to be processed, the multi-window system must display a plurality of dynamic images on windows.

As described above, when overlay-display control of windows is performed by only an OS, or when a dynamic image is overlay-displayed on output images by painting a portion inside a given window by a specific pixel data pattern, when high-speed image development to a memory, in particular, the overlay-display of a plurality of dynamic images on windows must be performed. If read/write accesses of image data to the memory and transfer processing of image data to an image display apparatus are executed by the OS, i.e., program commands, the OS is overloaded, and a satisfactory display speed cannot be obtained.

SUMMARY OF THE INVENTION

It is an object of the present invention to provide an image processing system, which can perform a high-speed overlay display of a dynamic image in a multi-window display system.

In order to achieve the above object, according to the present invention, there is provided an image processing system, which performs an overlay display for divisionally displaying a plurality of pieces of image information from a plurality of independent input image signal sources on a single screen, so that some or all of the plurality of pieces of image information overlap other image information, comprising: means for storing data associated with the overlay display; first selection means for selecting first image information from the plurality of pieces of image information on the basis of the data; second selection means for selecting second image information from the plurality of pieces of image information on the basis of the data; and display instruction means for instructing to overlay-display the first image information on the second image information in accordance with an overlay-display arrangement on the screen and the data.

According to the present invention, there is also provided an image processing system, which performs an overlay display for divisionally displaying a plurality of pieces of image information from a plurality of independent input image signal sources on a single screen, so that some or all of the plurality of pieces of image information overlap other image information, comprising: means for storing data associated with the overlay display; first selection means for selecting first image information from the plurality of pieces of image information on the basis of the data; second selection means for selecting second image information from the plurality of pieces of image information on the basis of the data; third selection means for selecting third image information from the plurality of pieces of image information on the basis of the data; means for generating fourth image information by mixing the first image information and the second image information at a predetermined mixing ratio; and display instruction means for instructing to overlay-display the fourth image information on the third image information in accordance with an overlay-display arrangement on the screen and the data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4 to 6, 8, 9, and 12 are diagrams showing the bit formats of data on a CPU data bus;

FIGS. 14A to 14E are diagrams showing a data setting state in the window display example shown in FIG. 13;

FIGS. 16A to 16E are diagrams showing a data setting state in the window display example shown in FIG. 15;

FIGS. 18A to 18E are diagrams showing a data setting state in the window display example shown in FIG. 17;

DETAILED DESCRIPTION OF THE PREFERRED EMBODIMENTS

The preferred embodiments of the present invention will be described in detail hereinafter with reference to the accompanying drawings.

[First Embodiment]

Figure 1:
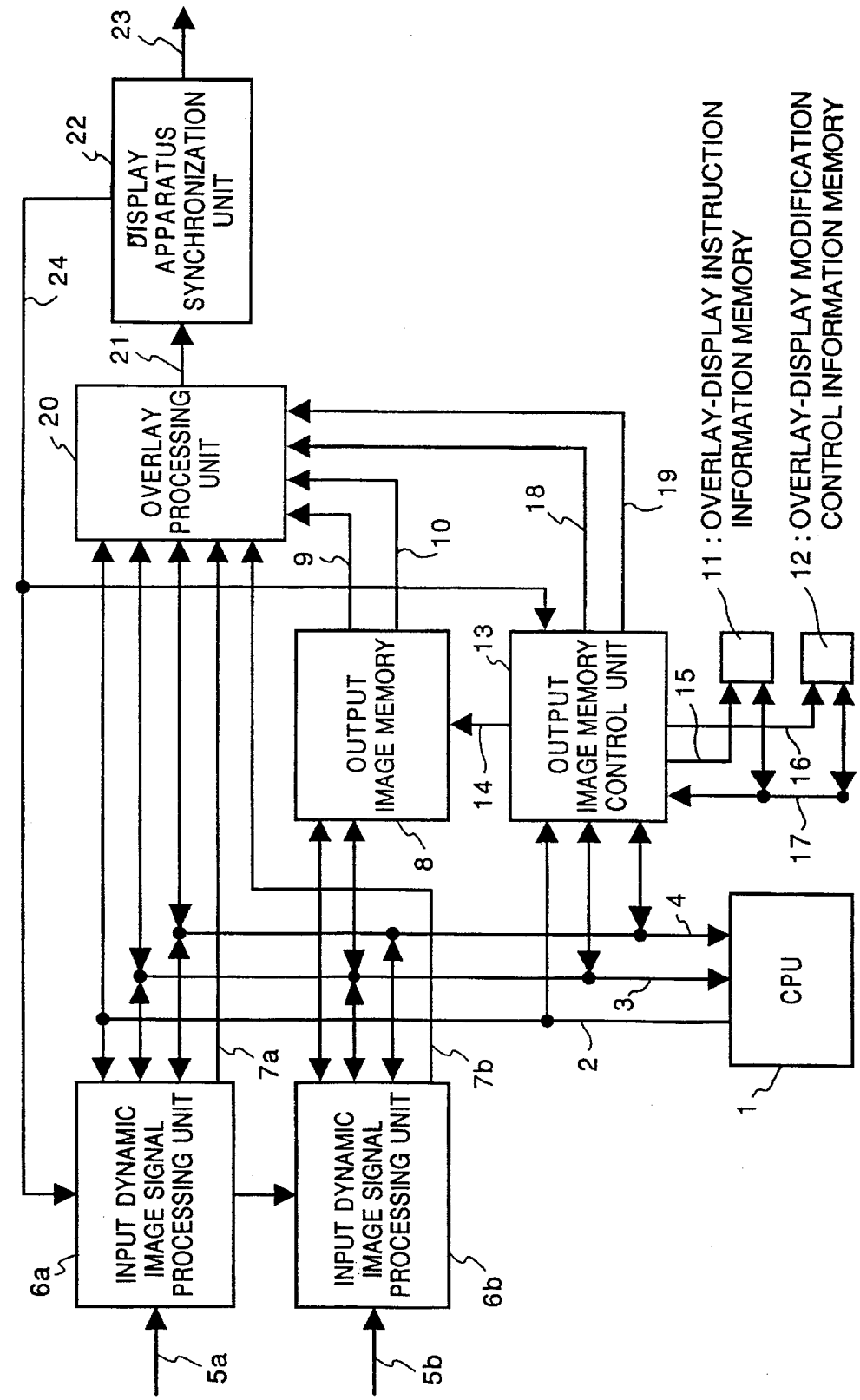
FIG. 1 is a block diagram showing an arrangement of the overall image processing system according to a first embodiment of the present invention.

FIG. 1 is a block diagram showing an arrangement of the overall image processing system according to the first embodiment of the present invention.

Figure 19A:
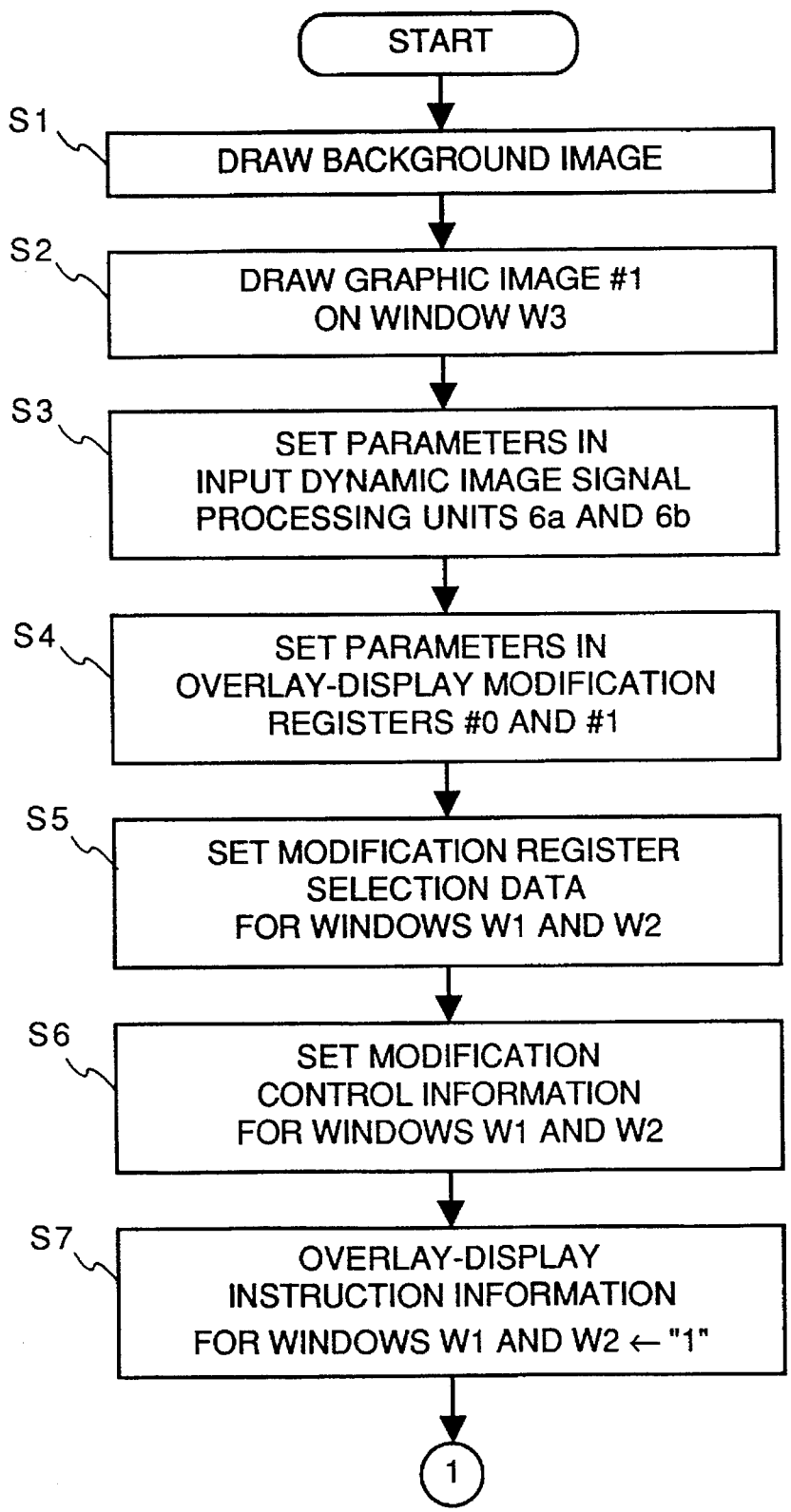
FIGS. 19A and 19B are flow charts showing display processing in the image processing system of the first embodiment.
Figure 19B:
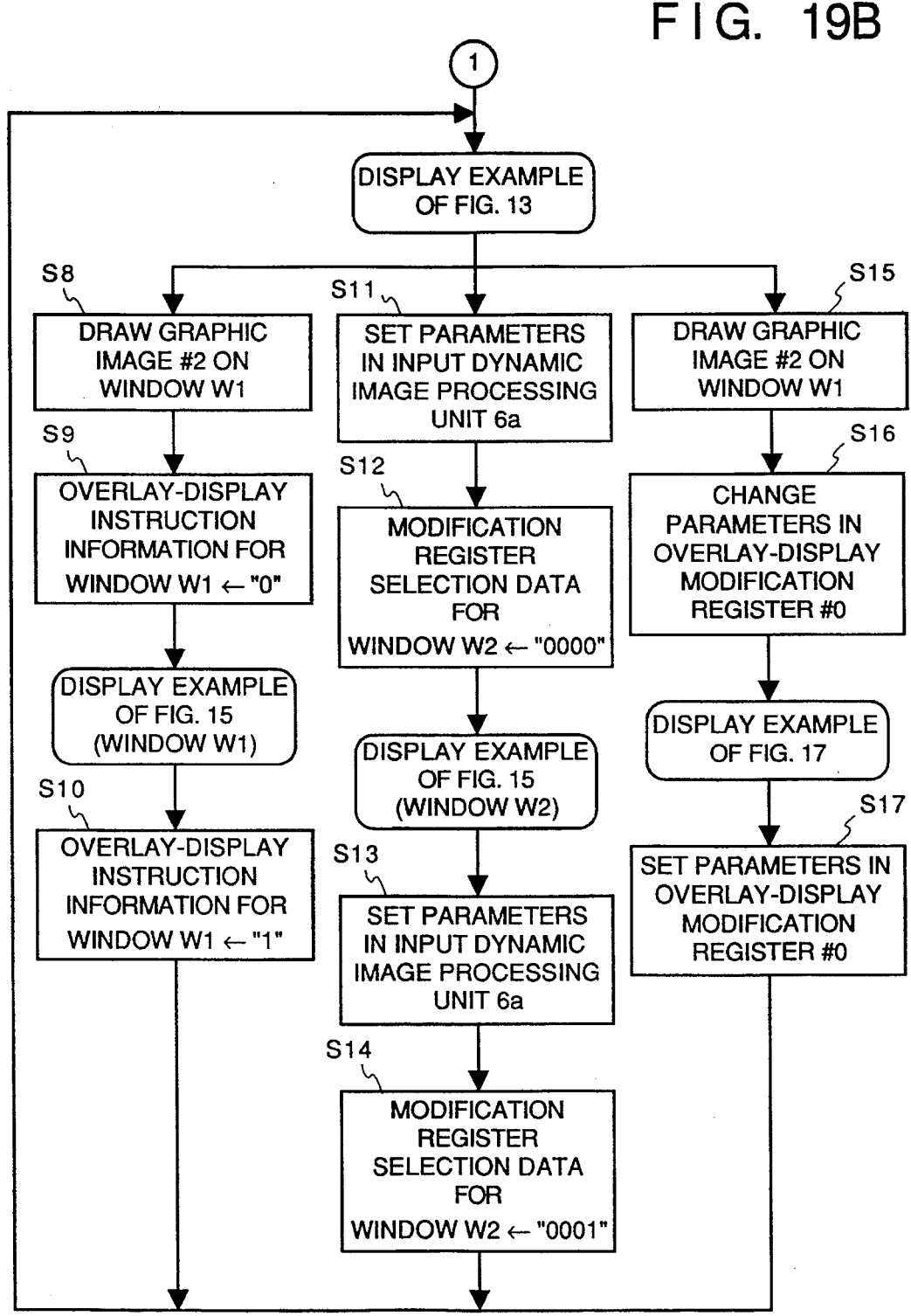

Referring to FIG. 1, reference numeral 1 denotes a central processing unit (CPU), which has a memory for storing a control sequence shown in FIGS. 19A and 19B, and the like, and controls the entire system according to the control sequence. This embodiment adopts a CPU having a 32-bit external address bus and a 32-bit external data bus. Reference numeral 2 denotes a CPU address bus having a 32-bit bus width. Reference numeral 3 denotes a CPU data bus having a 32-bit bus width.

Reference numeral 4 denotes a CPU control bus, which consists of various signals such as a signal indicating the start or end of a bus access by the CPU 1, a signal for discriminating a read/write access, and the like. Reference numerals 5a and 5b denote input dynamic image signals, which correspond to video signals output from a video camera and a dynamic image compression/expansion decoder (neither are shown). More specifically, each of the signals 5a and 5b consists of analog signals representing red, green, and blue color components of an input dynamic image, and a sync signal.

Reference numerals 6a and 6b denote input dynamic image signal processing units, each of which is comprised of an analog/digital (A/D) converter, a low-pass filter, an input image memory, an input image memory controller, an image enlargement/reduction converter, and the like (none of them are shown). Each of the input dynamic image signal processing units 6a and 6b stores an input dynamic image as the input dynamic image signal 5a or 5b in its input image memory as digital data. According to an instruction from the CPU 1, each of the input dynamic image signal processing units 6a and 6b performs pixel-density conversion of an input dynamic image at an arbitrary enlargement/reduction magnification for an arbitrary extraction range of the input dynamic image in units of frames, and generates image data including a required number of pixels. Each input dynamic image signal processing unit has a function of continuously outputting the input dynamic image pixel data generated in this manner in turn according to a display apparatus sync signal 24 output from a display apparatus synchronization unit 22 (to be described later).

Reference numerals 7a and 7b denote input dynamic image pixel data signals, which consist of 24-bit pixel data continuously output from the input dynamic image signal processing units 6a and 6b. In the system according to this embodiment, since there are two input dynamic image signal sources, pairs of input dynamic image signals, input dynamic image signal processing units, and input dynamic image pixel data signals are provided. More specifically, the pair of input dynamic image signals are respectively the signals 5a and 5b, the input dynamic image signal processing units corresponding to these signals are respectively denoted by reference numerals 6a and 6b, and the input dynamic image pixel data signals corresponding to these units are respectively the signals 7a and 7b. For the sake of simplicity, an input dynamic image generated by the input dynamic image processing unit 6a will be referred to as an input dynamic image a hereinafter, and an input dynamic image generated by the input dynamic image processing unit 6b will be referred to as an input dynamic image b hereinafter.

Reference numeral 8 denotes an output image memory, which is a bit map memory for editing an output image for an image display apparatus (not shown). The output image memory 8 has words of a number corresponding to the number of pixels constituting an output image on an output apparatus, and stores two kinds of data, i.e., pixel data for expressing a color of a pixel to be developed on the screen of the display apparatus, and data for selecting a modification register used upon overlay-display of a dynamic image, in one word on the output image memory 8 corresponding to each pixel.

In this embodiment, pixel data is expressed by 24 bits (each of red, green, and blue color components is expressed by 8 bits), and 4 bits are assigned to selection data for an overlay-display modification register. Therefore, the output image memory 8 has a total of 28-bit word width. In this case, a 24-bit portion for storing pixel data, and a 4-bit portion for storing selection data of the modification register are physically separated as memory elements. Therefore, these two data can be independently accessed, or can be simultaneously accessed.

Note that the output image memory 8 comprises a dual port (random port & serial port) type dynamic random-access memory (DRAM). The random port side is connected to the CPU data bus 3 to allow the CPU 1 to randomly read/write pixel data and overlay-display modification register selection data at an arbitrary pixel position on the output screen. On the other hand, the serial port side is connected to an overlay processing unit 20 (to be described later) to allow to continuously and regularly output pixel data and overlay-display modification register selection data at high speed to the display apparatus.

Reference numeral 9 denotes an output image pixel data signal, which consists of 24-bit pixel data continuously output in turn from the serial port of the output image memory 8.

Reference numeral 10 denotes an overlay-display modification register selection data signal, which consists of 4-bit overlay-display modification register selection data continuously output in turn from the serial port of the output image memory 8. Data on the data signal 10 and pixel data on the output image pixel data signal 9 are synchronized with each other, and are caused to correspond to a given pixel position.

Reference numeral 11 denotes an overlay-display instruction information memory, which stores information for instructing the overlay processing unit 20 (to be described later) to overlay-display input dynamic image pixel data on output images to the image display apparatus. The overlay-display instruction information memory 11 has a total capacity consisting of bits corresponding to the number of pixels constituting an output image on the output apparatus, and has a 32-bit word width in correspondence with the CPU data bus 3.

An arbitrary 1 bit on the overlay-display instruction information memory 11 corresponds to one pixel constituting an output image. When this bit is "1", it instructs the overlay processing unit 20 to overlay-display pixel data output from one of the two input dynamic image signal processing units 6a and 6b on the corresponding pixel. The overlay-display instruction information memory 11 comprises, e.g., a static RAM (SRAM) having a relatively high access speed. The CPU 1 can read/write 32-bit information from/in the memory 11 in a single access.

Therefore, upon a single access, the CPU 1 can instruct whether to perform or not to perform an overlay display for 32 continuous pixels constituting an output image. The content of the overlay-display instruction information memory 11 is periodically read out in units of 1 word (32 bits) by an output image memory control unit 13 (to be described later).

Reference numeral 12 denotes an overlay-display modification control information memory, which stores information for instructing the overlay processing unit 20 (to be described later) about processing for modification register selection data used when input dynamic image pixel data is overlay-displayed on an output image to the image display apparatus. The overlay-display modification control information memory 12 has a total capacity consisting of bits corresponding to the number of pixels constituting an output image on the output apparatus, and has a 32-bit word width in correspondence with the CPU data bus 3 like in the overlay-display instruction information memory 11.

An arbitrary 1 bit on the overlay-display modification control information memory 12 corresponds to one pixel constituting an output image. When this bit is "1", it instructs the overlay processing unit 20 to successively use modification register selection data used for the immediately preceding pixel as modification register selection data used when pixel data output from one of the two input dynamic image signal processing units 6a and 6b is overlay-displayed. The overlay-display modification control information memory 12 also comprises, e.g., an SRAM having a relatively high access speed like in the overlay-display instruction information memory 11. The CPU 1 can read/write 32-bit information from/in the memory 12 in a single access. The content of the overlay-display modification control information memory 12 is periodically read out in units of 1 word (32 bits) by the output image memory control unit 13 (to be described below).

Reference numeral 13 denotes an output image memory control unit, which performs read/write control of pixel data from the random port of the output image memory 8 upon reception of an instruction from the CPU 1, and also performs read/write control of overlay-display modification register selection data. Furthermore, the control unit 13 causes the output image memory 8 to continuously output pixel data and overlay-display modification register selection data from the serial port in synchronism with a display apparatus sync signal 24 (to be described later). Moreover, the output image memory control unit 13 periodically reads out data from the overlay-display instruction information memory 11, and the overlay-display modification control information memory 12. Then, the unit 13 continuously outputs the readout overlay-display instruction information and modification control information in synchronism with the pixel data and the overlay-display modification register selection data.

In read/write control of the pixel data and overlay-display modification register selection data from the random port of the output image memory 8, the output image memory control unit 13 has a function of selecting whether the two data are accessed independently or simultaneously with reference to address information output from the CPU 1 in an access. Furthermore, the output image memory control unit 13 also has a function of connecting an overlay-display information memory data bus 17 to the CPU data bus 3 when the CPU 1 accesses the overlay-display instruction information memory 11 or the overlay-display modification control information memory 12.

Reference numeral 14 denotes an output image memory control signal, which consists of an address strobe signal, a read/write strobe signal, and the like for the output image memory 8. These signals on the control signal 14 are generated by the output image memory control unit 13.

Reference numeral 15 denotes an overlay-display instruction information memory control signal, which consists of a chip enable signal, a read/write strobe signal, and the like for the overlay-display instruction information memory 11. The signals on the control signal 15 are also generated by the output image memory control unit 13.

Reference numeral 16 denotes an overlay-display modification control information memory control signal, which consists of a chip enable signal, a read/write strobe signal, and the like for the overlay-display modification control information memory 12. These signals on the control signal 16 are also generated by the output image memory control unit 13.

Reference numeral 17 denotes an overlay-display information memory data bus, which is separated from the CPU data bus 3. When the CPU 1 accesses the overlay-display instruction information memory 11 or the overlay-display modification control information memory 12, the bus 17 is connected to the CPU data bus 3 by the output image memory control unit 13.

Reference numeral 18 denotes an overlay-display instruction signal, which consists of overlay-display instruction information output from the output image memory control unit 13 in synchronism with the pixel data from the output image memory 8.

Reference numeral 19 denotes an overlay-display modification control signal, which consists of overlay-display modification control information output from the output image memory control unit 13 in synchronism with the pixel data from the output image memory 8.

Reference numeral 20 denotes an overlay processing unit, which has a function of overlay-displaying two systems of input dynamic image pixel data on pixel data output onto the output image pixel data signal 9 according to an instruction. The overlay processing unit 20 has a plurality of registers each for storing modification information for pixel data to be overlay-displayed, and has a function of executing modification processing of pixel data on the basis of information in the selected register. More specifically, the overlay processing unit 20 is constituted by a register file including the plurality of registers, multiplexers, digital arithmetic devices, and the like.

Reference numeral 21 denotes an overlay-display image pixel data signal, which consists of 24-bit output image pixel data generated in units of pixels by the overlay processing unit 20.

Reference numeral 22 denotes a display apparatus synchronization unit, which has a function of superposing a sync signal to the image display apparatus (e.g., a CRT monitor) on output image pixel data finally generated after overlay processing. More specifically, the unit 22 is constituted by a D/A converter, a sync signal generator, and the like.

Reference numeral 23 denotes an output image signal, which consists of a video signal output from the display apparatus synchronization unit 22. More specifically, the signal 23 consists of analog signals representing red, blue, and green color components of an output image, and a sync signal, and is input to the image display apparatus such as a CRT monitor.

Reference numeral 24 denotes a display apparatus sync signal, which is output from the display apparatus synchronization unit 22, and consists of a vertical sync signal, a horizontal sync signal, a line number data signal, a blanking signal, a dot clock signal, and the like. The input dynamic image signal processing units 6a and 6b, and the output image memory control unit 13 continuously perform output control of the pixel data and overlay-display control data in turn on the basis of the display apparatus sync signal 24.

Figure 2:
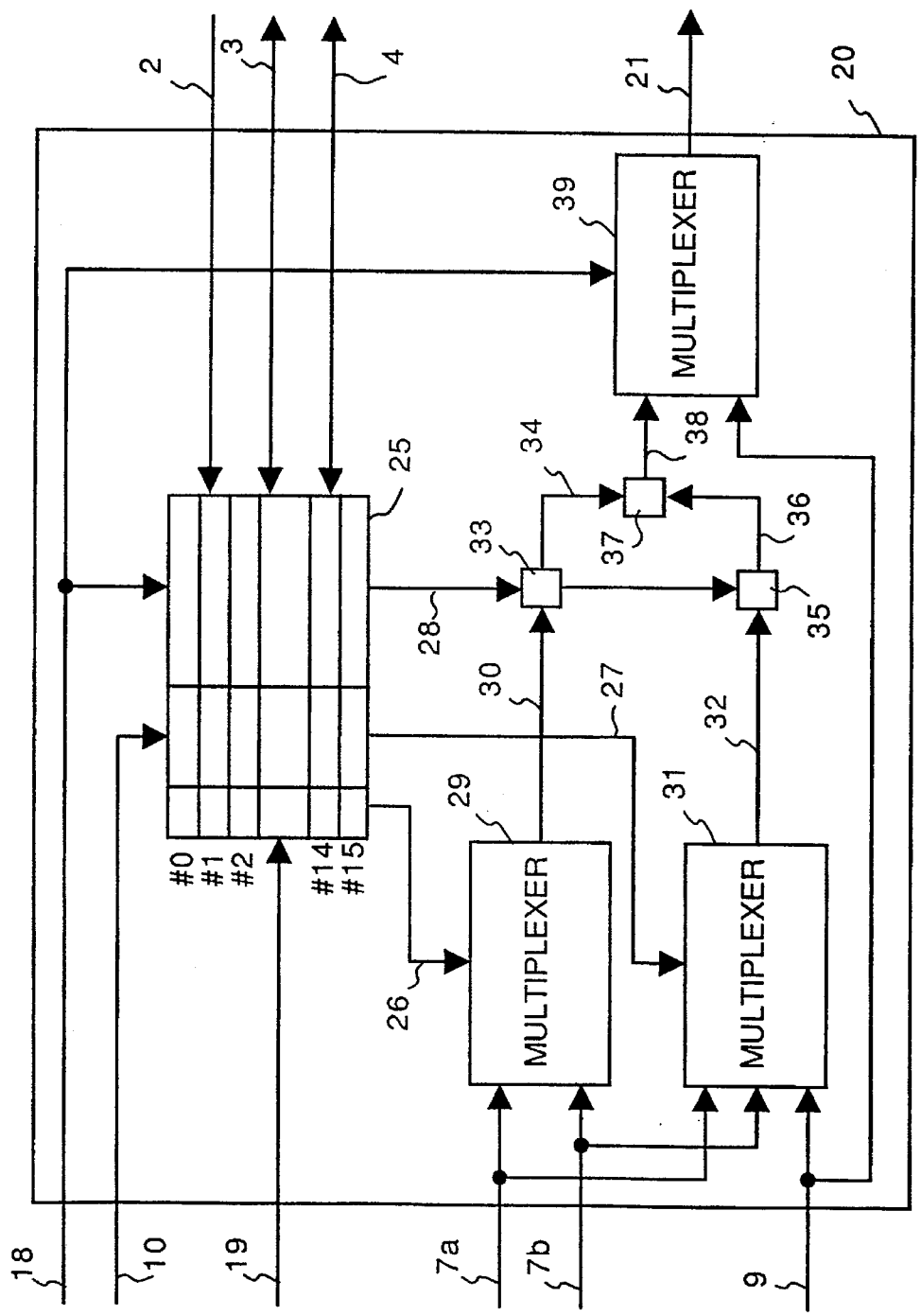
FIG. 2 is a block diagram showing a circuit arrangement of an overlay processing unit in the image processing system.

FIG. 2 is a block diagram showing the circuit arrangement of the overlay processing unit 20.

Referring to FIG. 2, reference numeral 25 denotes a register file, which has a 16-word capacity. Each word consists of 7 bits. In each of the registers in the register file, modification information used upon overlay display is set and stored by the CPU 1. The content of the register file is enabled according to the overlay display instruction signal 18. When the content of the register file is enabled, a specific one of 16 registers (#0 to #15) is selected according to selection data on the overlay-display modification register selection data signal 10.

The content of the selected register is latched according to the overlay-display modification control signal 19. When the content is latched, the register which was selected in processing of the immediately preceding pixel is successively enabled in processing of the next pixel data. In this case, overlay-display modification register selection data sent together with the next pixel data is ignored.

Reference numeral 26 denotes an overlay-display master image selection signal, which is output from the register file 25. According to the state of this signal, an input dynamic image serving as a master image of an overlay display is selected from two input dynamic images by a multiplexer 29.

Reference numeral 27 denotes an overlay-display background image selection signal, which is output from the register file 25. According to the state of this signal, a background image of an overlay display is selected from a plurality of images by a multiplexer 31.

Reference numeral 28 denotes a background mixing ratio information signal, which is output from the register file 25. According to 4-bit background mixing ratio information on this signal, a master image and a background image are mixed in an overlay display.

Reference numeral 29 denotes a multiplexer. The state of the overlay-display master image selection signal 26 is determined by the register file 25 according to overlay-display modification control information. According to the state of the overlay-display master image selection signal 26, the multiplexer 29 selects one of pixel data on the input dynamic image pixel data signals 7a and 7b. Reference numeral 30 denotes an overlay-display master image pixel data signal, which consists of 24-bit pixel data selected by the multiplexer 29.

Reference numeral 31 denotes a multiplexer, which selects one of an achromatic (black) image, pixel data on the output image pixel data signal 9, pixel data on the input dynamic image pixel data signal 7a, and pixel data on the input dynamic image pixel data signal 7b according to the state of the overlay-display background image selection signal 27.

Reference numeral 32 denotes an overlay-display background image pixel data signal, which consists of 24-bit pixel data of an overlay-display background image selected by the multiplexer 31. Reference numeral 33 denotes an arithmetic device, which multiplies pixel data on the overlay-display master image pixel data signal 30 with a coefficient according to the mixing ratio information on the overlay-display background mixing ratio information signal 28. In this case, the arithmetic device 33 multiplies the pixel data with a coefficient $(16-m)/16$ (where m is the mixing ratio information).

Reference numeral 34 denotes an overlay-display master mixing image pixel data signal, which consists of 24-bit pixel data of an overlay-display master image multiplied with the coefficient by the arithmetic device 33. Reference numeral 35 denotes an arithmetic device for multiplying pixel data on the overlay-display background image pixel data signal 32 with a coefficient according to the mixing ratio information on the overlay-display background mixing ratio information signal 28. In this case, the arithmetic device 35 multiplies the pixel data with a coefficient m/16 (where m is the mixing ratio information).

Reference numeral 36 denotes an overlay-display background mixing image pixel data signal, which consists of 24-bit pixel data of an overlay-display background image multiplied with the coefficient by the arithmetic device 35. Reference numeral 37 denotes an adder for adding pixel data on the overlay-display master mixing image pixel data signal 34 to pixel data on the overlay-display background mixing image pixel data signal 36.

Reference numeral 38 denotes an overlay-display mixed image pixel data signal, which consists of 24-bit pixel data of an overlay-display mixed image added by the adder 37. A multiplexer 39 selects one of pixel data on the overlay-display mixed image pixel data signal 38 and pixel data on the output image pixel data signal 9 according to the state of the overlay-display instruction signal 18. The 24-bit pixel data selected by the multiplexer 39 is output to the display apparatus synchronization unit 22 as the overlay-display image pixel data signal 21.

Figure 3:
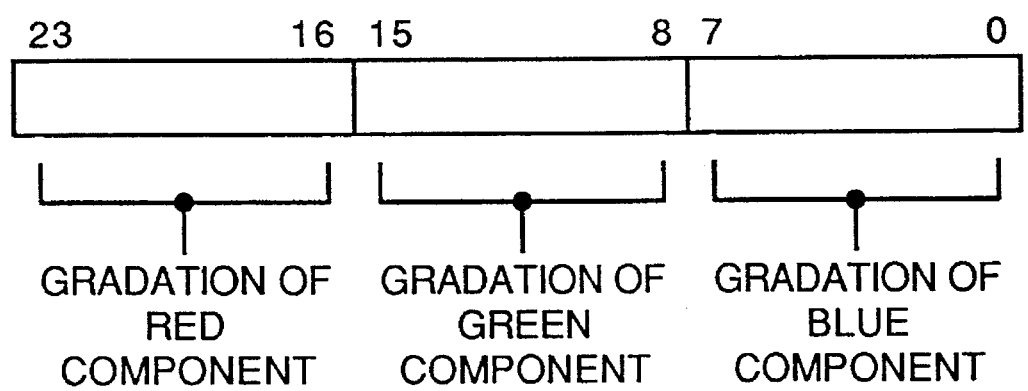
FIG. 3 is a diagram showing the bit format of image data.

FIG. 3 shows the bit format of pixel data on the input dynamic image pixel data signals 7a and 7b, and the output image pixel data signal 9 of FIG. 2.

Pixel data for expressing a color of each pixel consists of 24-bit data. The 24-bit data consists of three 8-bit gradation data of color components (red, blue, and green).

Figure 4:
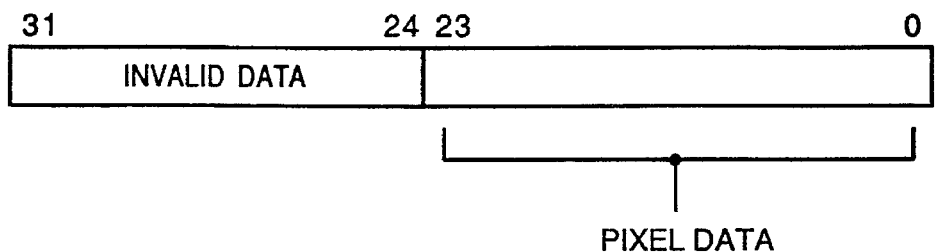

FIG. 4 shows the bit format of data on the CPU data bus 3 when the CPU 1 performs a read/write access of pixel data to the output image memory 8 of FIG. 1.

As shown in FIG. 4, pixel data to be stored or already stored in the output image memory 8 is assigned to the lower 24 bits. The bit format of the pixel data is the same as that shown in FIG. 3. Upper 8-bit data is invalid data.

Figure 5:
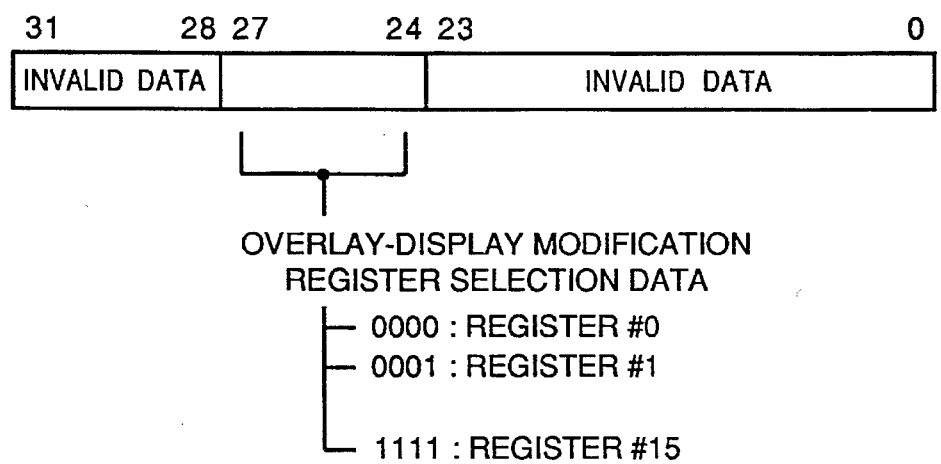

FIG. 5 shows the bit format of data on the CPU data bus 3 when the CPU 1 performs a read/write access of overlay-display modification register selection information to the output image memory 8.

Overlay-display modification register selection data to be stored or already stored in the output image memory 8 is assigned to the four bits "24" to "27". The 4-bit data selects one of the 16 overlay-display modification registers constituting the register file 25. Data in the four bits "28" to "31" and data in lower 24 bits are invalid data.

Figure 6:
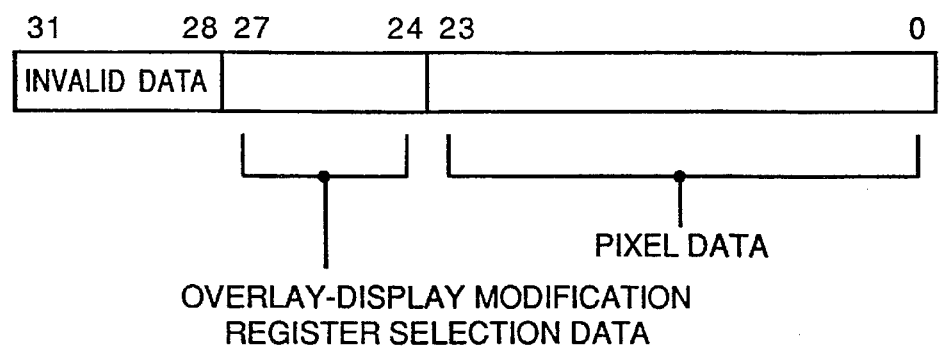

FIG. 6 shows the bit format of data on the CPU data bus 3 when the CPU 1 simultaneously reads/writes pixel data and overlay-display modification register selection data from/to the output image memory 8.

Pixel data to be stored or already stored in the output image memory 8 is assigned to the lower 24 bits. The bit format of this pixel data is the same as that shown in FIG. 3. In the four bits "24" to "27", overlay-display modification register selection data to be stored or already stored in the output image memory 8 is assigned. The bit format of the overlay-display modification register selection data is the same as that shown in FIG. 5. The upper 4-bit data is invalid data.

Figure 7:
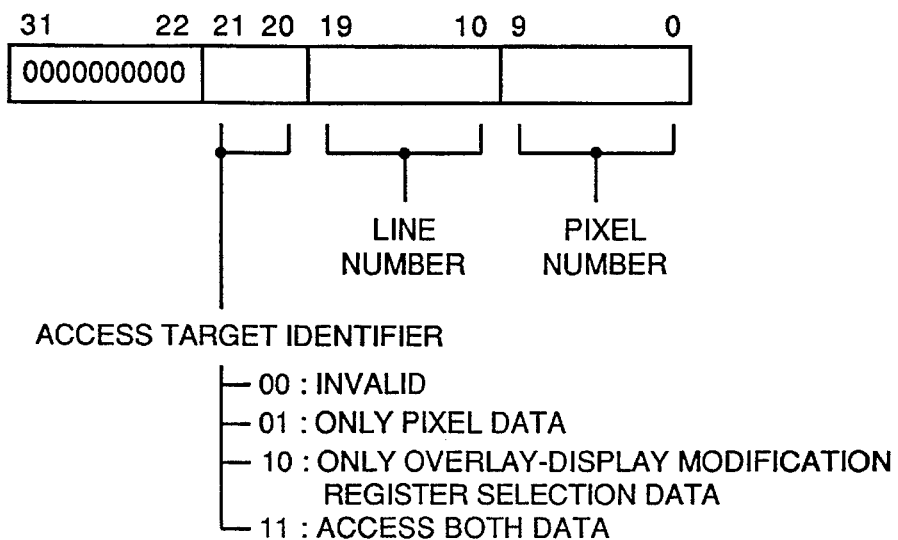
FIGS. 7 and 11 are diagrams showing the address bit formats on a CPU address bus.

FIG. 7 shows the bit format of address data when the CPU 1 independently or simultaneously reads or writes pixel data and/or overlay-display modification register selection data from or to the output image memory 8.

In 10 bits "10" to "19", a horizontal line (raster) number constituting an output image is assigned, and in the 10 bits "0" to "9", a pixel number of a pixel constituting the horizontal line is assigned. In bits "20" and "21", a 2-bit encoded identifier for identifying an access target to the output image memory 8 is assigned.

Figure 8:
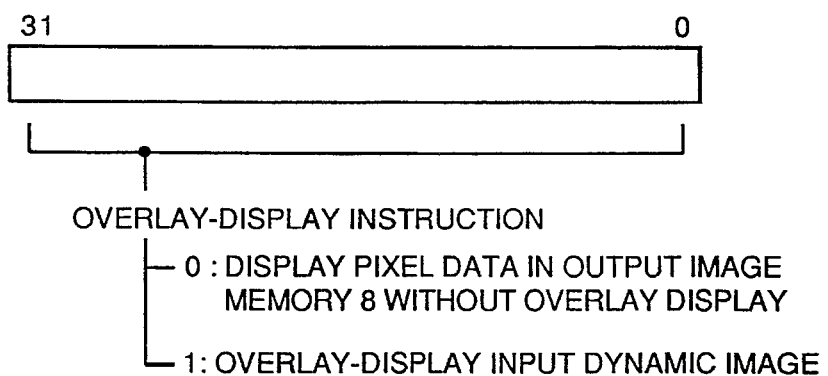

FIG. 8 shows the bit format of data on the CPU data bus 3 when the CPU 1 performs a read/write access of overlay-display instruction information to the overlay-display instruction information memory 11.

Respective bits correspond to continuous 32 pixels in the horizontal direction, which constitute an output image. When each bit is "1", it indicates to overlay-display pixel data output from one of the input dynamic image signal processing units 6a and 6b on the corresponding pixel; when each bit is "0", it indicates not to perform an overlay-display on the corresponding pixel, and to directly output pixel data on the output image memory 8 to the display apparatus.

Figure 9:
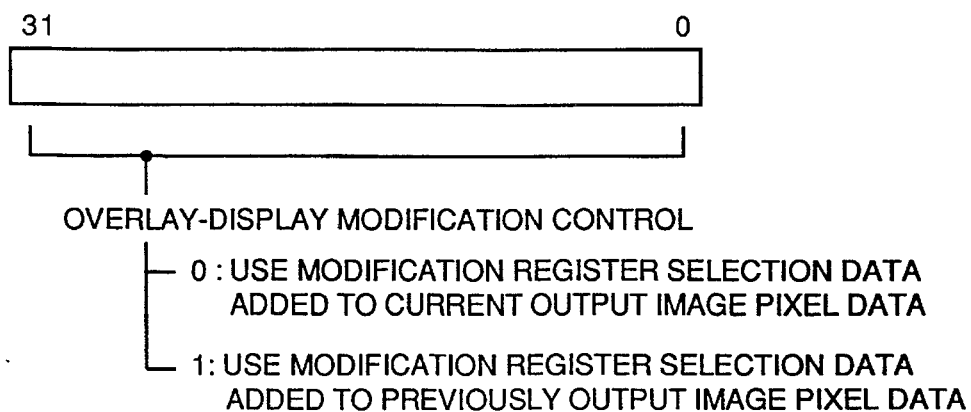

FIG. 9 shows the bit format of data on the CPU data bus 3 when the CPU 1 performs a read/write access of overlay-display modification control information to the overlay-display modification control information memory 12.

Respective bits correspond to continuous 32 pixels in the horizontal direction, which constitute an output image. When each bit is "1", it indicates to successively use the modification register selection data used for the immediately preceding pixel as modification register selection data used when pixel data output from one of the input dynamic image signal processing units 6a and 6b is to be overlay-displayed on the corresponding pixel. When each bit is "0", it indicates to use modification register selection data added to the current pixel data as modification register selection data.

Figures 10A, 10B:
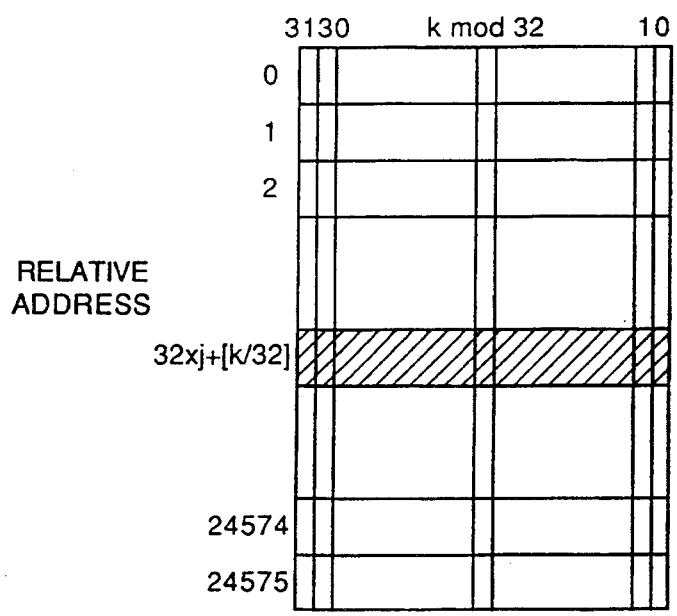
FIG. 10A is a diagram showing the relationship between the pixel number and the line number in an output image.
FIG. 10B is a diagram showing a word arrangement of an overlay-display instruction information memory and an overlay modification control information memory.

FIG. 10A shows the correspondence between the output image pixel number of an output image and the line number, and FIG. 10B shows the word arrangement of the overlay-display instruction information memory 11 and the overlay-display modification control information memory 12.

In this embodiment, an output image is constituted by 768 horizontal lines (rasters) each constituted by 1,024 pixels. One word from each of the memories 11 and 12 corresponds to a group of pixels obtained by dividing pixels constituting one line in units of 32 pixels from the left end. If the coordinates of a target pixel are represented by (j, k) (j: the line number, k: the pixel number on one line), the relative address of a word on the memories 11 and 12 corresponding to this pixel is calculated by 32×j+[k/32]. Symbols [] are Gaussian symbols for making only an integral part of a numerical value valid. A bit number on the word j×32+[k/32] is obtained by a command "kmod32".

Figure 11:
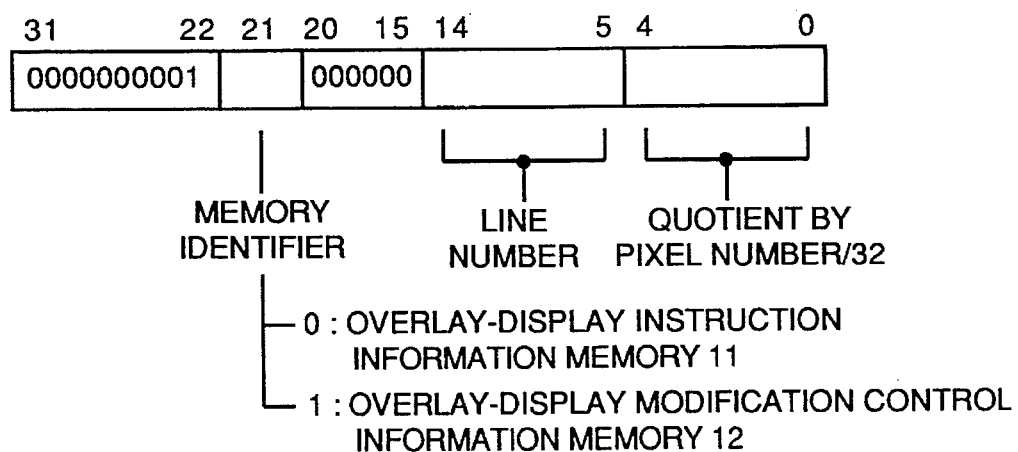

FIG. 11 shows the bit format of address data on the CPU address bus 2 when the CPU 1 performs a read/write access of information to the overlay-display instruction information memory 11 or the overlay-display modification control information memory 12.

In the 10 bits "5" to "14", a horizontal line (raster) number constituting an output image is assigned, and in the five bits "0" to "4", the integral part of the quotient obtained by dividing the pixel number of a pixel constituting the horizontal line with 32 (if the pixel number is k, [k/32] is assigned) is assigned. In bit "21", an identifier for identifying whether an access is made to the memory 11 or 12 is assigned.

FIG. 12 shows the bit format of data on the CPU data bus 3 when the CPU 1 performs a read/write access of overlay-display modification data to the register file 25.

In bit "6", overlay-display master image selection information is assigned. If this bit is "0", the input dynamic image pixel data signal 7a is selected as an overlay-display master image; when it is "0", the input dynamic image pixel data signal 7b is selected.

In the two bits "4" and "5", overlay-display background image selection information is assigned. According to a combination of these bits, one of an achromatic (black) image, pixel data on the output image pixel data signal 9, pixel data on the input dynamic image pixel data signal 7a, and pixel data on the input dynamic image pixel data signal 7b is selected as an overlay-display background image. In the four bits "0" to "3", background mixing ratio information is assigned. According to the content indicated by these 4 bits, the master image and the background image are mixed in an overlay display. Other bits are invalid data.

Figure 13:
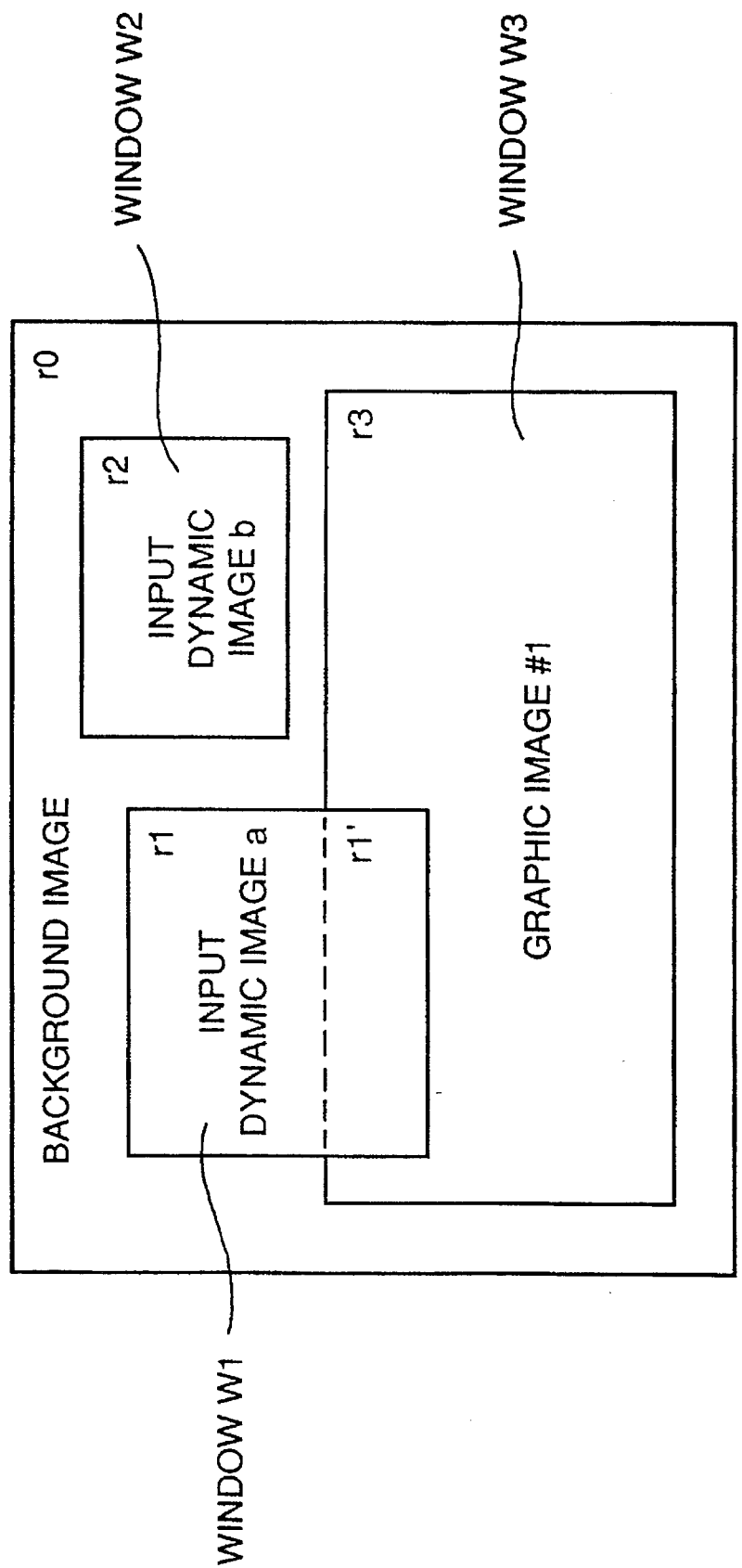
FIG. 13 is a diagram showing a window display example in the image processing system of the first embodiment.

FIG. 13 shows a window display on the screen of the image display apparatus in the image processing system according to the embodiment of the present invention.

Referring to FIG. 13, display regions r1 and r1' constitute a window W1, and an input dynamic image a generated by the input dynamic image signal processing unit 6a is displayed on the window W1. A display region r2 constitutes a window W2, and an input dynamic image b generated by the input dynamic image signal processing unit 6b is displayed on the window W2. A display region r3 constitutes a window W3, and a graphic image #1 written in the output image memory 8 by the CPU 1 is displayed on the window W3.

A region r0 as the remaining region of these display regions r1, r1', r2, and r3 is a background region, and a background pattern image written in the output image memory 8 by the CPU 1 is displayed on this region like in the region r3. In this display example, the display regions of the windows W1 and W2 on which dynamic images are overlay-displayed can be entirely seen. On the other hand, a portion of the window W3 is concealed under the window W1. In FIG. 13, the display region r1' is a portion of the window W1, where the window W3 overlaps.

FIGS. 14A to 14E respectively show the contents, the valid pixel data of the output image memory 8, the portions where bits of the overlay-display instruction information memory 11 are "1", and the valid overlay-display modification control (selection data) information memory 12 corresponding to the five display regions r1, r1', r2, r3, and r0 in the window display example shown in FIG. 13, and the portions where bits on overlay-display modification control information in the memory are 1, that is the contents of registers #0 and #1 in the register file 25.

Pixel data in a hatched portion of FIG. 14A is valid in the output image memory 8. Bits in the overlay-display instruction information memory 11 in the hatched portions of FIG. 14B are "1". In FIG. 14C, data in overlay-display modification registers in hatched portions is valid, and bits corresponding to hatched portions of FIG. 14D in overlay-display modification control information memory 12 are "1".

The register #0 shown in FIG. 14E is set to select the input dynamic image a as the overlay-display master image, and to display only pixel data of the input dynamic image a on the display apparatus. On the other hand, the register #1 is set to select the input dynamic image b as a master image, and to display only pixel data of the input dynamic image b on the display apparatus. Since the display regions r1, r1', and r2 are regions for overlay-displaying input dynamic images, the bits, corresponding to the pixels constituting these regions, on the overlay-display instruction information memory 11 are all "1"s (a hatched portion of FIG. 14B).

In contrast to this, since the display regions r3 and r0 are regions independent from an overlay display, the bits, corresponding to pixels constituting these regions, on the overlay-display instruction information memory 11 are all "0"s. In the regions where the bits are "0", only pixel data portions (lower 24-bit portion) of the output image memory 8 are processed, and overlay-display modification register selection data portions (bits "27" to "24") of the memory 8, and the contents of the corresponding bits of the overlay-display modification control information memory 12 do not influence a display operation at all.

The display regions r1 and r1' are portions where pixel data of the input dynamic image pixel data signal 7a is overlay-displayed. Therefore, data "0000" is stored in each overlay-display modification register selection data portion (bits "24" to "27") of words on the output image memory 8 corresponding to pixels at the left end of the horizontal lines of pixels constituting these regions r1 and r1', so as to select the overlay-display modification register #0. As for pixels other than the pixels at the left end, the contents of bits "24" to "27" are not particularly specified. In addition, the contents of pixel data portions (lower 24 bits) of words on the output image memory 8 corresponding to pixels constituting the display regions r1 and r1' do not influence a display operation at all.

Furthermore, bits on the overlay-display modification control information memory 12, which bits correspond to pixels at the left end of the horizontal lines of pixels constituting the display regions r1 and r1' are set to be all "0"s so as to make valid 4-bit overlay-display modification register selection data corresponding to these bits and set on the output image memory 8. On the other hand, bits on the memory 12, which correspond to the remaining portion excluding the pixels at the left end of the horizontal lines of the pixels constituting the display regions r1 and r1' are set to be all "1"s so as to similarly utilize the overlay-display modification register selection data set for the pixels at the left end of the display regions.

The display region r2 is a region where pixel data of the input dynamic image pixel data signal 7b is overlay-displayed. Therefore, data "0001" is stored in each overlay-display modification register selection data portion (bits "24" to "27") of words on the output image memory 8 corresponding to pixels at the left end of the horizontal lines of pixels constituting the region r2 so as to select the overlay-display modification register #1.

As for pixels other than the pixels at the left end, the contents of bits "24" to "27" are not particularly specified. The contents of the pixel data portions (lower 24 bits) of words on the output memory 8 corresponding to pixels constituting the display region r2 do not influence a display operation at all. Furthermore, bits on the overlay-display modification control information memory 12, which bits correspond to pixels at the left end of the horizontal lines of pixels constituting the display region r2 are set to be all "0"s so as to make valid 4-bit overlay-display modification register selection data corresponding to these bits and set on the output image memory 8.

On the other hand, bits of the memory 12, which correspond to the remaining portion excluding the pixels at the left end of the horizontal lines of the pixels constituting the region r2 are set to be all "1"s so as to successively utilize the overlay-display modification register selection data set for the pixels at the left end of this display region.

The contents of pixel data portions (lower 24 bits) of words on the output image memory 8 corresponding to the pixels constituting the display regions r1, r1', and r2 on which input dynamic images are overlay-displayed do not influence a display operation at all, whereas the CPU 1 is allowed to write graphic data.

Figure 15:
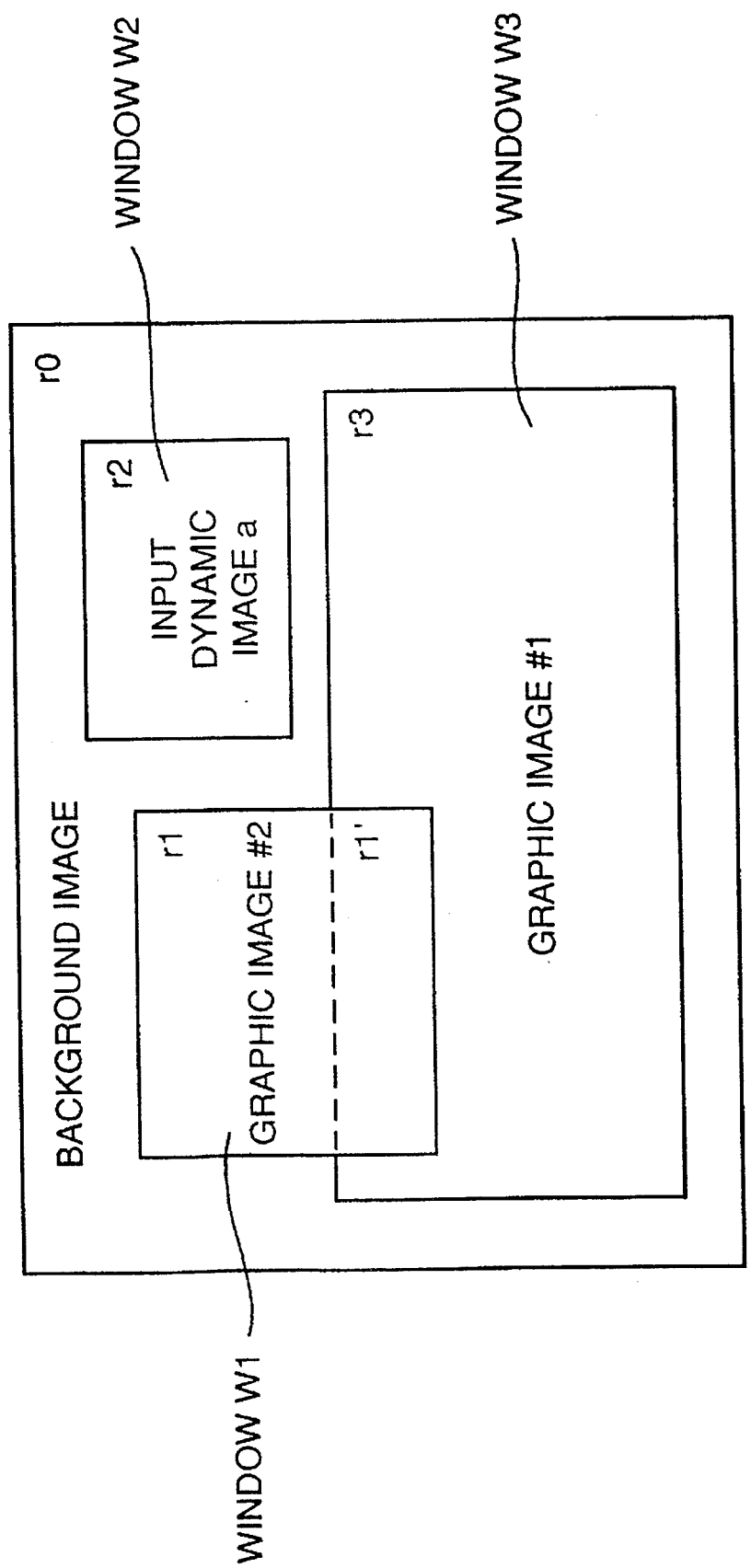
FIG. 15 is a diagram showing another window display example in the image processing system of the first embodiment.

FIG. 15 shows another window display example on the screen of the image display apparatus of the image processing system according to this embodiment.

Referring to FIG. 15, display regions r1 and r1' constitute a window W1, and a graphic image #2 written in the output image memory 8 by the CPU 1 is displayed on the window 1. A display region r2 constitutes a window W2, and an input dynamic image a generated by the input dynamic image processing unit 6a is displayed on the window W2. A display region r3 constitutes a window W3, and a graphic image #1 written in the output image memory 8 by the CPU 1 is also displayed on this window. A region r0 as the remaining region of these display regions r1, r1', r2, and r3 is a background region, and a background pattern image written in the output image memory 8 by the CPU 1 is displayed on this region like in the regions r1, r1', and r3.

In this example, the display regions of the window W1 where the graphic image #2 is displayed and the window W2 where the dynamic image is overlay-displayed can be entirely seen. On the other hand, a portion of the display region of the window W3 is concealed under the window W1. In FIG. 15, the display region r1' corresponds to a portion of the window W1 where the window W3 overlaps.

Differences between this display example and the display example shown in FIG. 13 are that an image displayed on the window W1 is changed from the overlay-displayed input dynamic image a to the graphic image (#2) written by the CPU 1, and that an input dynamic image displayed on the window W2 is changed from the input dynamic image b to the input dynamic image a.

FIGS. 16A to 16E respectively show the contents of the output image memory 8, the overlay-display instruction information memory 11, and the overlay-display modification control information memory 12 corresponding to the five display regions r1, r1', r2, r3, and r0 in the window display example shown in FIG. 15, and the contents of registers #0 and #1 in the register file 25.

Pixel data in a hatched portion of FIG. 16A is valid in the output image memory 8. Bits in the overlay-display instruction memory 11 in a hatched portion of FIG. 16B are "1". In FIG. 16C data in overlay-display modification registers in a hatched portion is valid, and bits corresponding to a hatched portion of FIG. 16D in overlay-display modification control information memory 12 are "1".

The contents of the registers #0 and #1 shown in FIG. 16E are the same as those in FIG. 14E.

In the display example shown in FIG. 13, the display regions r1 and r1' are regions for overlay-display of an input dynamic image. However, in the display example shown in FIG. 15, since the display regions r1 and r1' are regions for displaying a graphic image without an overlay display, bits on the overlay-display instruction information memory 11, which bits correspond to pixels constituting these regions, are changed from all "1"s to all "0"s (see FIG. 16B). As for these regions r1 and r1' for displaying the graphic image, overlay-display modification register selection data portions (bits "24" to "27") on the output image memory 8, and the contents of the corresponding bits on the overlay-display modification control information memory 12 are ignored since they do not influence a display operation. However, in contrast to this, pixel data portions (lower 24 bits) of words on the output image memory 8 corresponding to the pixels constituting the regions r1 and r1' are made valid.

Since the display region r2 is a region for overlay-displaying an input dynamic image like in the display example of FIG. 13, bits on the overlay-display instruction information memory 11, which bits correspond to pixels constituting the region are left set to be all "1"s (a hatched portion in FIG. 16B) so as to perform an overlay display. However, the input dynamic image b is selected as an overlay-display master image for this region r2 in the display example of FIG. 13, whereas data is changed to select the input dynamic image a in the display example of FIG. 15.

Therefore, the contents of overlay-display modification register selection data portions (bits "24" to "27") of words on the output image memory 8 corresponding to pixels at the left end of horizontal lines of pixels constituting the region r2 are changed to "0000" so as to select the overlay-display modification register #0. As for pixels other than the pixels at the left end, the contents of bits "24" to "27" are not particularly specified.

As in the display example of FIG. 13, bits on the overlay-display modification control information memory 12 corresponding to the pixels at the left end of the horizontal lines of the pixels constituting the display region r2 are set to be all "0"s so as to make valid 4-bit overlay-display modification register selection data corresponding to these bits and set on the output image memory 8.

On the other hand, bits on the memory 12 corresponding to the remaining portion excluding the pixels at the left end of the horizontal lines of the pixels constituting the regions r1 and r1' are set to be all "1"s so as to similarly utilize the overlay-display modification register selection data set for the pixels at the left end of the display region. Since the display regions r3 and r0 are regions independent from an overlay display as in the display example of FIG. 13, bits on the overlay-display instruction information memory 11 corresponding to pixels constituting these regions are left set to be all "0"s (see FIG. 16B).

Figure 17:
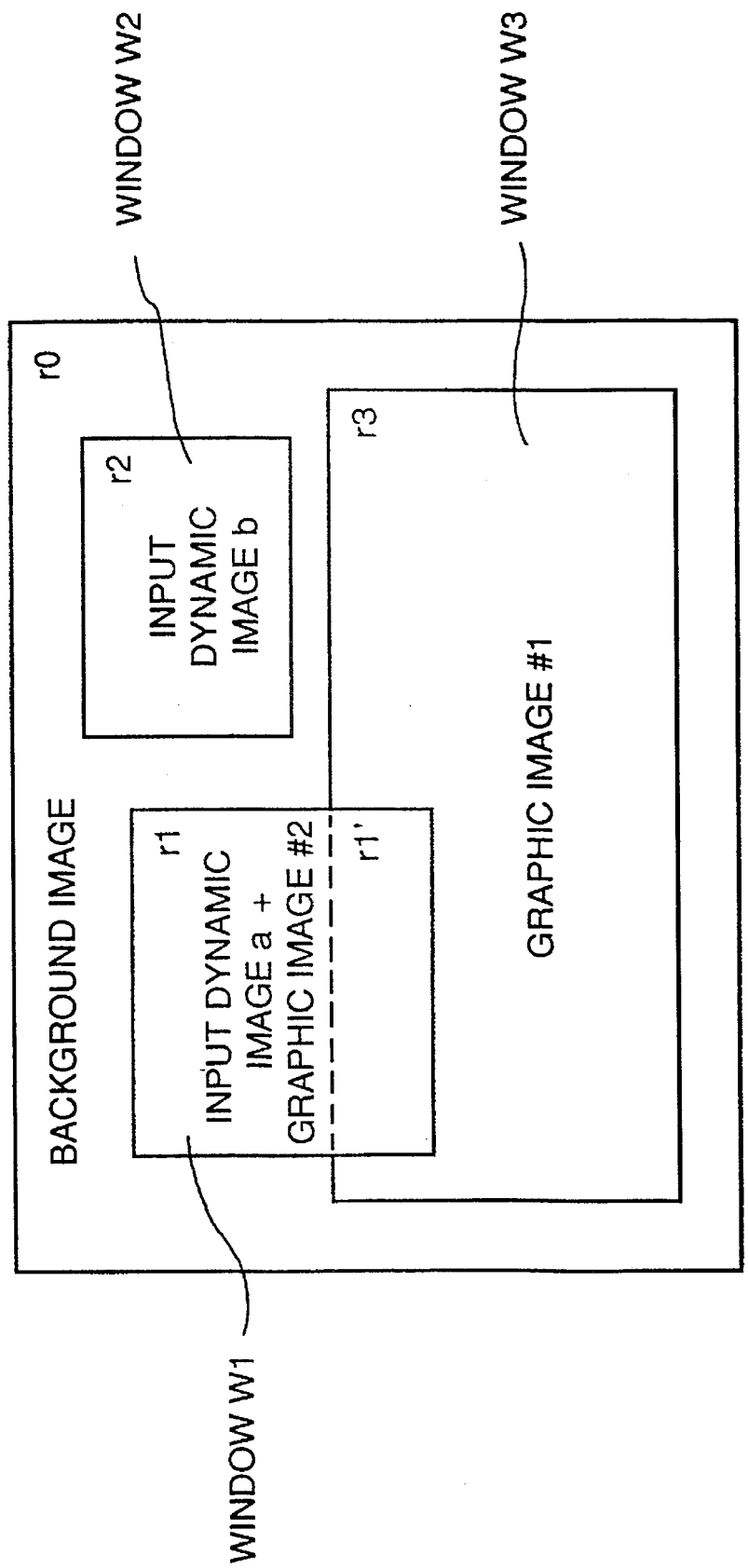
FIG. 17 is a diagram showing still another window display example in the image processing system of the first embodiment.

FIG. 17 shows still another window display example on the screen of the image display apparatus of the image processing system of this embodiment.

Referring to FIG. 17, display regions r1 and r1' constitute a window W1, and a mixed image of an input dynamic image a generated by the input dynamic image signal processing unit 6a and a graphic image #2 written in the output image memory 8 by the CPU 1 is displayed on the window W1. A display region r2 constitutes a window W2, and a dynamic image generated by the input dynamic image signal processing unit 6b is displayed on the window W2. A display region r3 constitutes a window W3, and a graphic image #1 written in the output image memory 8 by the CPU 1 is displayed on the window W3. A region r0 as the remaining region of these display regions r1, r1', r2, and r3 is a background region, and a background pattern image written in the output image memory 8 by the CPU 1 is displayed on this region like in the region r3.

In this example, the display regions of the window W1 where the dynamic image is overlay-displayed and the window W2 where the dynamic image is displayed can be entirely seen. On the other hand, a portion of the display region of the window W3 is concealed under the window W1. In FIG. 17, the display region r1' corresponds to a portion of the window W1 where the window W3 overlaps.

A difference between this display example and the display example shown in FIG. 13 is that an image displayed on the window W1 is only the input dynamic image a generated by the input dynamic image signal processing unit 6a in the example shown in FIG. 13, while an image is changed to a mixed image of the input dynamic image a and the graphic image #2 written by the CPU 1 in this example.

FIGS. 18A to 18E respectively show the contents of the output image memory 8, the overlay-display instruction information memory 11, and the overlay-display modification control information memory 12 corresponding to the five display regions r1, r1', r2, r3, and r0 in the window display example shown in FIG. 17, and the contents of registers #0 and #1 in the register file 25.

Pixel data in a hatched portion of FIG. 18A is valid in the output image memory 8. Bits in the overlay-display instruction information memory 11 in hatched portions of FIG. 18B are "1". In FIG. 18C data in overlay-display modification registers in hatched portions is valid, and bits corresponding to hatched portions of FIG. 18D in overlay-display modification control information memory 12 are "1".

The content of the register #1 shown in FIG. 18E is the same as that shown in FIG. 14E. However, the content of the register #0 is changed to select pixel data of the input dynamic image pixel data signal 7a as an overlay-display master image and pixel data of the output image memory pixel data signal 9 as a background image, and to mix the background image at a mixing ratio of 8/16.

The display regions r1 and r1' are regions for overlay-displaying the input dynamic image a in basically the same manner as in the display example of FIG. 13. Therefore, bits on the overlay-display instruction information memory 11 corresponding to pixels constituting these regions are left set to be all "1"s (hatched portions in FIG. 18B) so as to perform an overlay display. Since information indicating the mixing ratio with the graphic image #2 is set in the overlay-display modification register #0, as described above, data "0000" is left stored in each overlay-display modification register selection data portion (bits "24" to "27") of words on the output image memory 8 corresponding to pixels at the left end of horizontal lines of the pixels constituting the regions r1 and r1' so as to select the overlay-display modification register #0 (see FIG. 18C).

Furthermore, the content of the overlay-display modification control information memory 12 associated with these regions r1 and r1' is the same as that in the display example of FIG. 13. In this case, the contents of pixel data portions (lower 24 bits) of words on the output image memory 8 corresponding to the pixels constituting these regions are made valid. Since the display region r2 is the same as that in the display example of FIG. 13, the contents of the memories corresponding to pixels constituting this region are the same as those in FIGS. 14A to 14D. Since the display regions r3 and r0 are regions independent from an overlay display like in the display example of FIG. 13, bits on the overlay-display instruction information memory 11 corresponding to pixels constituting these regions are left set to be all "0"s (see FIG. 18B).

FIGS. 19A and 19B are flow charts showing the control flow of the CPU 1 for performing display operations shown in FIGS. 13, 15, and 17 in the image processing system of this embodiment.

The flow shown in FIGS. 19A and 19B is a sequence for performing a display in the display example shown in FIG. 13, and then changing the display state to that of the display example shown in FIG. 15 or 17.

The control flow executed using the CPU 1 as a central element in the image processing system of this embodiment will be described below relative to FIGS. 19A and 19B with reference to FIGS. 1 to 18E.

In step (to be abbreviated to simply as "S" hereinafter) 1, the CPU 1 paints all the pixels constituting an output image, i.e., the entire output screen with a background image pattern.

When background image pixel data is written in the output image memory 8 in this step, the CPU 1 clears all the bits of the overlay-display instruction information memory 11 to "0" so as to output pixel data stored in the image output memory 8 to the image display apparatus in correspondence with all the pixels constituting an output image. Thus, the overlay processing unit 20 unconditionally outputs pixel data output from the output image memory 8 as the overlay-display image pixel data signal 21 via the multiplexer 39.

Thereafter, the CPU 1 writes the background image pixel data in pixel data portions (lower 24 bits) of the output image memory 8. When overlay-display modification register selection data, which is also stored in the output image memory 8, is to be initialized at the same time in this pixel data write access, the CPU 1 sets "11" in bits "21" and "20" of address data for accessing the output image memory 8, as shown in FIG. 7. Furthermore, as the bit format of data to be output onto the CPU data bus 3, as shown in FIG. 6, both pixel data and overlay-display modification register selection data must be respectively assigned to bits "0" to "23" and bits "24" to "27" of the data in advance.

However, when the overlay-display modification register selection data, which is also stored in the output image memory 8, is not accessed in the pixel data write access, the CPU 1 sets "01" in bits "21" and "20" of address data for accessing the output image memory 8, as shown in FIG. 7. Furthermore, as the bit format of data to be output onto the CPU data bus 3, as shown in FIG. 4, pixel data must be assigned to bits "0" to "23" of the data.

When the CPU 1 makes an access to the output image memory 8, the output image memory control unit 13 identifies with reference to bits "21" and "20" of address data output onto the CPU address bus 2 by the CPU 1 whether the current access is made for only the pixel data portion (bits "23" to "0"), for only the overlay-display modification register selection data portion (bits "24" to "27"), or for both the data (bits "0" to "27"), as shown in FIG. 7. Based on this identification signal, the CPU 1 performs a read/write access of a target portion to the output image memory 8. This control can be realized by a relatively simple control circuit as long as the output image memory 8 is physically divided into a memory element for storing the pixel data and a memory element for storing the overlay-display modification register selection data.

In S2, the CPU 1 draws a graphic image #1 on the display region r3 constituting the window W3. Since the bits of the overlay-display instruction information memory 11 have already been cleared to all "0"s in S1 above, pixel data of the graphic image #1 need only be written on pixels, corresponding to the region r3, on the output image memory 8 so as to display the graphic image #1 on the image display apparatus. In this stage, the display region of the window W3 can be entirely seen without being concealed under another window.

In S3, the CPU 1 sets necessary parameters in the input dynamic image signal processing units 6a and 6b, thereby starting a continuous output operation of pixel data of input dynamic images. The parameters to be set include an extraction range of an input dynamic image, an enlargement/reduction magnification, the start position (the coordinates at the upper left end of the window) of a region to be subjected to an overlay display on an output image, and the number of lines of the region, the number of pixels per line, and the like. Thus, the input dynamic image signal processing unit 6a begins to output pixel data onto the input dynamic image pixel data signal 7a in synchronism with the output timing of pixel data constituting the display regions r1 and r1' from the output image memory 8. In addition, the input dynamic image signal processing unit 6b begins to output pixel data onto the input dynamic image pixel data signal 7b in synchronism with the output timing of pixel data constituting the display region r2 from the output image memory 8.

In S4, the CPU 1 sets parameters in the overlay-display modification registers #0 and #1 in the register file 25. As shown in FIGS. 12 and 14E, the register #0 is set to select the input dynamic image a as an overlay-display master image, and to display only pixel data of the input dynamic image a on the display apparatus. On the other hand, the register #1 is set to select the input dynamic image b as an overlay-display master image, and to display only pixel data of the input dynamic image b on the display apparatus.

The flow advances to S5, and the CPU 1 sets overlay-display modification register selection data in the output image memory 8, which data correspond to the display regions r1 and r1' constituting the window W1 and the display region r2 constituting the window W2, as shown in FIG. 14C. More specifically, as for the display regions r1 and r1', data "0000" is written in words corresponding to the pixels at the left end in the regions so as to select the overlay-display modification register #0. As for the display region r2, data "0001" is written in words corresponding to the pixels at the left end in the region so as to select the overlay-display modification register #1.

When these modification register selection data are written in the output image memory, the CPU 1 sets "10" in bits "21" and "20" of address data to be sent onto the CPU address bus 2, as shown in FIG. 7, and uses the bit format of data to be sent onto the CPU data bus 3 in which modification register selection data is assigned to bits "24" to "27", as shown in FIG. 5. In this manner, the output image memory control unit 13 performs a write access of modification register selection data to the output image memory 8, while preserving background image pixel data which were written in the portions, corresponding to the display regions r1, r1', and r2, on the output image memory 8 in S1.

Since overlay-display modification register selection data in words corresponding to pixels other than those at the left end in the display regions r1, r1', and r2 are made invalid upon setting of overlay-display modification control information in next S6, no data are set in this step. The overlay-display modification register selection data written in the output image memory 8 are output as the overlay-display modification register selection data signal 10 from the output image memory control unit 13 to the overlay processing unit 20 together with pixel data in the output image memory 8.

In the overlay processing unit 20, as shown in FIG. 2, specific display modification registers are selected from the 16 overlay-display modification registers in the register file 25 according to data on the overlay-display modification register selection signal 10.

In S6, the CPU 1 sets bits in the overlay-display modification control information memory 12, which bits correspond to pixels in the display regions r1, r1', and r2, as shown in FIG. 14D.

First, bits corresponding to the pixels at the left end in each region are written with all "0"s so as to make valid the 4-bit overlay-display modification register selection data set on the output image memory 8 in correspondence with the bits in S5. Similarly, bits corresponding to pixels other than those at the left end in each region are written with all "1"s so as to successively utilize the overlay-display modification register selection data set in S4.

The control information written in the overlay-display modification control information memory 12 is read out by the output image memory control unit 13 periodically (every time pixel data for 32 pixels are output from the output image memory 8), and thereafter, the information is sent to the overlay processing unit 20 as the overlay-display modification control signal 19. In the overlay processing unit 20, as shown in FIG. 2, when the state of the overlay-display modification control signal 19 is "1", the overlay-display modification register selected in processing of the immediately preceding pixel is successively selected. In this case, selection data on the overlay-display modification register selection data signal 10, sent together with pixel data of interest, is ignored.

After the preparation of the overlay display operation of input dynamic images is completed in S3 to S6, the flow advances to S7, and the CPU 1 writes "1" in bits in the overlay-display instruction information memory 11, which bits correspond to the display regions r1 and r1' constituting the window W1, and the display region r2 constituting the window W2, as shown in FIG. 14B.

The instruction information written in the overlay-display instruction information memory 11 is read out by the output image memory control unit 13 periodically (every time pixel data for 32 pixels are output from the output image memory 8), and thereafter, the information is sent to the overlay processing unit 20 as the overlay-display instruction signal 18.

In the overlay processing unit 20, as shown in FIG. 2, overlay processing is performed for pixels corresponding to the state "1" of the overlay-display instruction signal 18. The register file 25 is made valid, and one of the registers is selected according to the overlay-display modification register selection data added to the output image pixel data of a pixel of interest. The selected register outputs its content as the signals 26, 27, and 28 to control the multiplexers 29 and 31 and the arithmetic devices 33 and 35, and overlay-processed pixel data of the input dynamic image are finally output from the multiplexer 39 onto the overlay-display image pixel data signal 21.

For example, an operation of the overlay processing unit 20 for pixels corresponding to the display regions r1 and r1' constituting the window W1 will be described below. As described above, the register file 25 is made valid. A pixel to be subjected to overlay processing first of the pixels in the display regions r1 and r1' in units of lines (i.e., a first pixel corresponding to the state="1" of the overlay-display instruction signal 18 in units of lines) is the pixel at the left end of each region.

As for the pixel at the left end in units of lines, since its overlay-display modification control information is set to be "0" in S6 described above, a new modification register is selected by the overlay-display modification register selection data added to output image pixel data. Since this selection data is set to be "0000" in S5, the modification register #0 is selected.

In the content of the modification register #0, the overlay-display master image selection bit is set to be "0" in S4, i.e., the input dynamic image a is selected. Thus, the multiplexer 29 selects the input dynamic image pixel data signal 7a, and outputs the selected pixel data as the overlay-display master image pixel data signal 30. In the modification register #0, the overlay-display background image selection bits are set to be "00", i.e., achromatic data is selected. Therefore, the multiplexer 31 selects achromatic data, and outputs 24-bit data of all "0"s as the overlay-display background image pixel data signal 32.

Furthermore, the background image mixing ratio in the modification register #0 is set to be "0000", and this data represents that pixel data of the master image is displayed without modifications. Therefore, the arithmetic device 33 has a coefficient of "16/16=1", and directly outputs input pixel data of the master image as the overlay-display master mixing image pixel data signal 34. On the other hand, the arithmetic device 35 has a coefficient of "0/16=0", and outputs 24-bit data of all "0"s as the overlay-display background mixing image pixel data signal 36 regardless of the input pixel data of the background image. Therefore, since pixel data on the pixel data signal 36 is 24-bit data of all "0"s, the adder 37 directly outputs the pixel data of the master image on the pixel data signal 34 as the overlay-display mixed image pixel data signal 38.

Since the state of the overlay-display instruction signal 18 is "1", the multiplexer 39 in the final stage of the overlay processing unit 20 consequently outputs the pixel data of the master image on the pixel data signal 38 as the overlay-display image pixel data signal 21. In this manner, the pixel data on the input dynamic image pixel data signal 7a is output as the overlay-display image pixel data signal 21. As for pixels other than the pixels at the left end in the display regions r1 and r1', since the overlay-display modification control information thereof is set to be "1" in S6 above, the modification register #0 selected in the processing of the pixel at the left end is successively made valid independently of the modification register selection data.

Therefore, the same processing as that for the pixel at the left end is performed. As for pixels in the region r1', since pixel data on the input dynamic image pixel data signal 6a are preferentially output to the display apparatus, as described above, a graphic image #1 of the window #3, which was displayed before the overlay display, is not displayed. That is, the graphic image #1 is concealed under the window W1. However, the graphic image #1 written in the output image memory 8 in S2 is preserved.

Substantially the same operation of the overlay processing unit 20 as that for the window W1 is performed for pixels corresponding to the display region r2 constituting the window W2, except that the modification register #1 is selected, and the input dynamic image b is used as the overlay-display master image.

With the processing in S1 to S7 described above, the window display shown in FIG. 13 is realized.

A sequence for changing the display state in the display example of FIG. 13 to the display state in the display example of FIG. 15 will be described below.

On the window W1, the input dynamic image a is overlay-displayed in the display example of FIG. 13, while the graphic image #2 is displayed in the display example of FIG. 15.

In S8, the CPU 1 draws the graphic image #2 on the display regions r1 and r1' constituting the window W1. When pixel data of the graphic image #2 are written in the output image memory 8, only pixel data portions (lower 24 bits) of the output image memory 8 need only be accessed.

For this purpose, data "01" need only be assigned to bits "21" and "20" of address data to be sent onto the CPU address bus 2 by the CPU 1, as shown in FIG. 7, and pixel data need only be assigned to bits "0" to "23" of data to be sent onto the CPU data bus 3, as shown in FIG. 4. In this stage, since the content of the overlay-display instruction information memory 11 is set to be "1" in S7, the display regions r1 and r1' keep overlay-displaying the input dynamic image a.

The flow then advances to S9, and the CPU 1 writes "0"s in bits, corresponding to the display regions r1 and r1' constituting the window W1, in the overlay-display instruction information memory 11, as shown in FIG. 16B. As shown in FIG. 2, the overlay processing unit 20 does not perform overlay processing for pixels corresponding to the state="0" of the overlay-display instruction signal 18, and the multiplexer 39 outputs pixel data of the graphic image #2 input from the output image pixel signal 9 as the overlay-display image pixel data signal 21. With this processing in S9, the display state on the window W1 is changed to that in the display example shown in FIG. 15.

When the display state is to be restored from this state to that in the display example shown in FIG. 13, the flow advances to S10, and "1" is written in bits, which were set to be "0" in S9 above, and correspond to the display regions r1 and r1', in the overlay-display instruction information memory 11, as shown in FIG. 14D. Thus, the overlay display of the input dynamic image a is started on the window W1.

A sequence for changing the display state in the display example of FIG. 13 to that in the display example of FIG. 15 in association with the window W2 will be described below.

On the window W2, the input dynamic image b is overlay-displayed in the above-mentioned display example of FIG. 13, while the input dynamic image a is to be overlay-displayed in the display example of FIG. 15.

In S11, the CPU 11 changes parameters set in the input dynamic image signal processing unit 6a. The parameters to be changed in this step include an enlargement/reduction magnification, the start position of a region to be subjected to the overlay display, the number of lines in the region, and the number of pixels per line.

The flow then advances to S12, and the content of an overlay-display modification register selection data portion (bits "24" to "27") in a word on the output image memory 8, which word corresponds to a pixel at the left end of each horizontal line, of pixels constituting the region r2 is changed to "0000" so as to select the overlay-display modification register #0, as shown in FIG. 16C.

Setting of overlay-display modification register selection data in words corresponding to pixels other than the pixels at the left end in the display region r2 need not be changed since it becomes insignificant upon setting of overlay-display modification control information in S6. With this processing in S12, the display state on the window W2 is changed to that in the display example shown in FIG. 15.

When the display state is to be restored from this state to that in the display example shown in FIG. 13, the flow advances to S13, and the parameters such as the enlargement/reduction magnification, the start position of the region to be subjected to the overlay display, the number of lines of the region, the number of pixels per line, and the like of the input dynamic image signal processing unit 6a are changed to output pixel data to the display regions r1 and r1'.

The flow then advances to S14, and the content of an overlay-display modification register selection data portion (bits "27" to "24") in a word on the output image memory 8, which word corresponds to a pixel at the left end of each horizontal line, of pixels constituting the region r2 is restored to "0001" so as to select the overlay-display modification register #1, as shown in FIG. 14C. Since the parameters have already been set in the input dynamic image signal processing unit 6*b* so as to output pixel data to the display region r2 in S3, the overlay display of the input dynamic image b is immediately restarted on the window W2.

A sequence for changing the display state in the display example of FIG. 13 to that in the display example of FIG. 17 will be explained below.

In this sequence, the following point is changed. That is, the input dynamic image a is overlay-displayed on the window W1 in the above-mentioned display example of FIG. 13, while a synthesized image of the input dynamic image a and the graphic image #2 is to be overlay-displayed in the display example of FIG. 17.

In S15, the graphic image #2 is drawn on the display regions r1 and r1' constituting the window W1. In S16, parameters of the overlay-display modification register #0 in the register file 25 are changed, as shown in FIG. 18E.

As shown in FIG. 18E, the register #0 is set to select the input dynamic image a as the overlay-display master image, and to mix the pixel data of the input dynamic image a with output image pixel data selected as a background image at a ratio of 1:1 on the display apparatus.

As the overlay-display modification register selection data for the display regions r1 and r1' constituting the window W1, data "0000" is written in advance in a word corresponding to each pixel at the left end in the regions in S5 above so as to select the overlay-display modification register #0. For this reason, the overlay processing unit 20 continues overlay display processing according to the new information set in the modification register #0.

More specifically, since the overlay-display master image selection bit is set to be "0", i.e., the input dynamic image a is selected, the multiplexer 29 selects the input dynamic image pixel data signal 7*a*, and outputs the pixel data as the overlay-display master image pixel data signal 30. Since the overlay-display background image selection bits in the modification register #0 are set to be "01", i.e., the output image pixel data is selected, the multiplexer 31 selects the output image pixel data signal 9, and outputs the pixel data as the overlay-display background image pixel data signal 32.

Furthermore, the background image mixing ratio in the modification register #0 is set to be "1000", and this data represents that pixel data obtained by mixing a product of the master image pixel data with 8/16 and a product of the background image pixel data with 8/16 is to be displayed. Therefore, the arithmetic device 33 has a coefficient of "8/16", and outputs data obtained by multiplying the input master image pixel data with 8/16 as the overlay-display master mixing image pixel data signal 34.

On the other hand, the arithmetic device 35 has a coefficient of "8/16", and outputs data obtained by multiplying the input background image pixel data with 8/16 as the overlay-display background mixing image pixel data signal 36. Therefore, the adder 37 adds the 8/16 master image pixel data on the pixel data signal 34 and the 8/16 background image pixel data on the pixel data signal 36, and outputs the sum pixel data as the overlay-display mixed image pixel data signal 38.

Since the state of the overlay-display instruction signal 18 is "1", the multiplexer 39 in the final stage of the overlay processing unit 20 outputs the mixed image pixel data on the pixel data signal 38 as the overlay-display image pixel data signal 21. In this manner, pixel data obtained by mixing the pixel data on the input dynamic image pixel data signal 7*a* and the pixel data on the output image pixel data signal 9 is output as the overlay-display image pixel data signal 21. With this processing in S16, the display state is changed to that in the display example shown in FIG. 17.

When the display state is to be restored from this state to that in the display example shown in FIG. 13, the flow advances to S17, and the parameters, rewritten in S16, are set again in the overlay-display modification register #0, as shown in FIG. 14E.

Thus, the overlay display of only the input dynamic image a is started on the window W1.

In this manner, the following effects are expected.

(1) When the bits on the overlay-display instruction information memory 11 are rewritten in units of words (32 bits) as in processing in S7, S9, and S10, whether an input dynamic image is to be overlay-displayed or a normal graphic image is to be displayed can be set in a single access for a maximum of 32 continuous pixels in the line direction. Thus, a switching operation between the overlay display of the input dynamic image and the normal graphic image display for many continuous pixels like in a display region in a window can be performed at high speed.

(2) As in processing in S16 and S17, a master image to be overlay-displayed can be changed for all of a plurality of pixels, which select a given overlay-display modification register, in a single access for rewriting the content of the modification register. Thus, the input dynamic images a and b as master images to be overlay-displayed can be switched at high speed for many continuous pixels like in a display region in a window.

(3) As in processing in S16 and S17, a background image to be mixed in the overlay display can be changed for all of a plurality of pixels, which select a given overlay-display modification register, in a single access for rewriting the content of the modification register. In this manner, the input dynamic images a and b, a graphic image on the output memory 8, and an achromatic image, which can serve as a background image to be mixed in the overlay display, can be switched at high speed for many continuous pixels in a display region in a window.

(4) As in processing in S16 and S17, the mixing ratio upon image synthesis processing of an input dynamic image and a background image can be changed for all of a plurality of pixels, which select a given overlay-display modification register, in a single access for rewriting the content of the modification register. Thus, the mixing ratio upon image synthesis processing of an input dynamic image and a background image can be changed at high speed in units of 1/16 for many continuous pixels in a display region in a window.

(5) As in processing in S12 and S14, selection data of a modification register used in an overlay display can be changed for all the pixels, which are successively located in the line direction, and correspond to the content="1" in the overlay-display modification control information memory 12, in a small number of times of accesses for rewriting the content of overlay-display modification register selection data corresponding to each pixel located at the left end in a display region constituting a window. Thus, an input dynamic image to be overlay-displayed, a background image to be mixed, and the mixing ratio upon image synthesis processing of the input dynamic image and the background image can be switched between different display states at high speed for many continuous pixels in a display region in a window.

(6) As in processing in S5, S8, S12, S14, and S16, output image pixel data portions (lower 24 bits) can be desirably accessed while preserving the overlay-display modification register selection data portions (bits "24" to "27") on the image output memory 8, the overlay-display modification register selection data portions can be desirably accessed while preserving the output image pixel data portions, or both these data portions can be simultaneously accessed. In this manner, an unexpected change in modification register selection data in an application program can be prevented, and a window display with full of expressions can be realized.

[Second Embodiment]

A second embodiment of the present invention will be described below with reference to the accompanying drawings.

Figure 20:
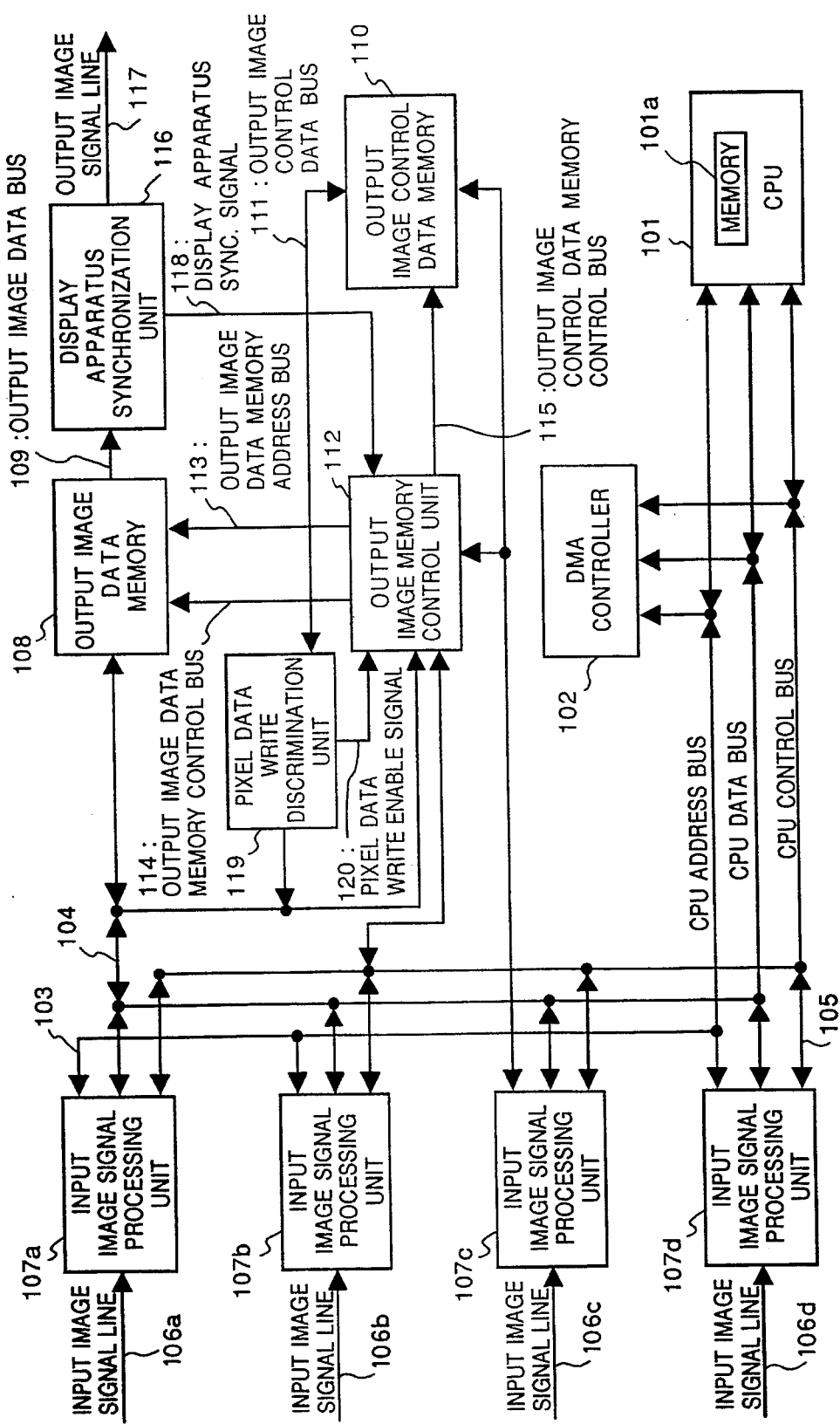
FIG. 20 is a block diagram showing an arrangement of the overall image processing system according to a second embodiment of the present invention.

FIG. 20 is a block diagram showing an arrangement of the overall image processing system (to be referred to simply as a system hereinafter) according to the second embodiment of the present invention. Referring to FIG. 20, a CPU 101 serves as a processor for executing predetermined processing according to a program, as the core of control in the system of this embodiment, and as a main controller for controlling the entire system. A DMA controller 102 periodically transfers pixel data from input image signal processing units 107a to 107d to an output image data memory 108, as will be described later. The CPU 101 and the DMA controller 102 or the input image signal processing units 107a to 107d are connected through a CPU address bus 103 and a CPU data bus 104. A CPU control bus 105 transfers a signal indicating the start or end of a bus access by the CPU 101 or the DMA controller 102, a read/write identification signal, and the like.

Input image signal lines 106a to 106d transfer video signals from, e.g., a video camera (not shown), i.e., analog signals representing red, green, and blue color components of an input image, and a sync signal. Each of the input image signal processing units 107a to 107d comprises, e.g., an A/D converter, a low-pass filter, an input image memory, an input image memory controller, an image enlargement/reduction converter, and the like. The units 107a to 107d have a function of storing input images sent through the input image signal lines 106a to 106d in their input image memories as digital data, and outputting pixel data, which is converted and generated at an arbitrary enlargement/reduction magnification for an arbitrary extraction range of an input image according to an instruction from the CPU 101.

In this embodiment, since the number of input image signal sources is four, the four pairs of input image signal lines 106a, 106b, 106c, and 107d are connected to input image signal processing units 107a, 107b, 107c, and 107d as shown.

The output image data memory 108 is a memory for editing an output image for an image display apparatus (not shown). The output image data memory 108 has words of a number corresponding to the number of pixels constituting an output image on the display apparatus, and one word in the memory corresponding to each pixel. The memory stores pixel data expressing a color of a pixel to be developed on the screen of the display apparatus. In this system, since the pixel data is expressed by 24 bits (each of red, green, and blue color components is expressed by 8 bits), the output image data memory 108 has a 24-bit word width.

The output image data memory 108 comprises a dual port (random port & serial port) type DRAM. Of these ports, the random port is connected to the CPU data bus 104 to allow randomly write pixel data at arbitrary pixel positions on the output screen. On the other hand, the serial port is connected to a display apparatus synchronization unit 116 (to be described later) to allow periodic and regular provision of output pixel data to the display apparatus at high speed. An output image data bus 109 transfers 24-bit pixel data sequentially output from the serial port of the output image data memory 108.

An output image control data memory 110 has words of a number corresponding to the number of pixels constituting an output image on the display apparatus as in the output image data memory 108, and one word in the memory corresponding to each pixel. The memory stores information necessary for target control and has a word width capable of expressing the control information. In this embodiment, since designation information indicating whether or not a write access of pixel data is enabled is stored in units of pixels, the output image control data memory 110 has a 4-bit word width equal to "4" as the number of input image signal sources. The output image control data memory 110 comprises a RAM having a higher access speed than that of the output image data memory 108. Note that an output image control data bus 111 is a data input/output bus of the output image control data memory 110.

An output image memory control unit 112 performs read/write control of pixel data from the random port to the output image data memory 108, periodic output control of pixel data from the serial port of the output image data memory 108, read/write control of control data to the output image control data memory 110, and write control of pixel data to the output image data memory according to the state of a pixel data write enable signal 120. An output image data memory address bus 113 transfers address information for the output image data memory 108, and the address information is generated by the output image memory control unit 112.

An output image data memory control bus 114 transfers an address strobe signal, a read/write strobe signal, and the like for the output image data memory 108, and signals on the control bus 114 are generated by the output image memory control unit 112. An output image control data memory control bus 115 transfers a chip enable signal, a read/write strobe signal, and the like, for the output image control data memory 110, and these signals are also generated by the output image memory control unit 112.

The display apparatus synchronization unit 116 has a function of superposing a sync signal, for an image display apparatus such as a CRT monitor on pixel data output onto the output image data bus 109. More specifically, the unit 116 is constituted by, e.g., a D/A converter, a sync signal generator, an analog arithmetic device, and the like. An output image signal line 117 transfers a video signal output from the display apparatus synchronization unit 116, i.e., analog signals representing red, green, and blue color components of an output image, and a sync signal. The line 117 is connected to an image display apparatus (not shown) such as a CRT monitor.

A display apparatus sync signal 118 is output from the display apparatus synchronization unit 116, and consists of a vertical sync signal, a horizontal sync signal, a blanking signal, a dot clock, and the like. The output image memory control unit 112 performs periodic output control of pixel data from the serial port of the output image data memory 108.

A pixel data write discrimination unit 119 discriminates based on designation information in units of pixels, which information is read out onto the output image control data bus 111, and indicates whether or not a write access is enabled, whether or not a write access of pixel data to the output image data memory 108 is enabled. The pixel data write enable signal 120 is made active when the pixel data write discrimination unit 119 determines that a write access of pixel data to the output image data memory 108 is enabled. The pixel data write enable signal 120 is input to the output image memory control unit 112.

Figure 21:
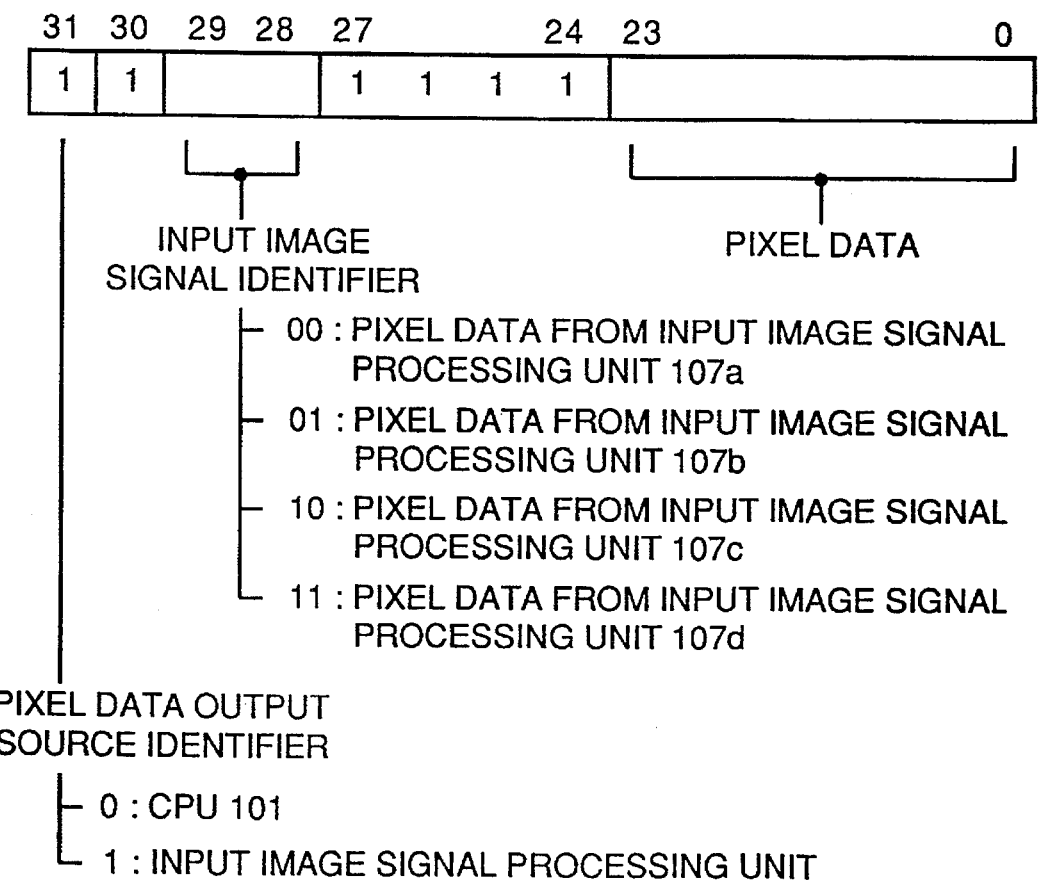
FIG. 21 is a diagram showing the bit format of data output from an input image signal processing unit 7 or a CPU 1 onto a CPU data bus 4 in the second embodiment.

FIG. 21 shows the bit format of data output from the CPU 101 or the input image signal processing units 107a to 107d onto the CPU data bus 104. As shown in FIG. 21, pixel data for expressing a color of each pixel is assigned the lower 24 bits of the data, and a 2-bit encoded identifier for identifying the four input image signal processing units (107a to 107d) is assigned to bits "29" and "28". A flag bit for identifying whether data is output onto the CPU data bus 104 from the CPU 101 or the input image signal processing units 107a to 107d is assigned to bit "31". In an example shown in FIG. 21, since "1" is set in bit "31", it indicates that this data is read out from the input image signal processing units 107a to 107d.

Figure 22:
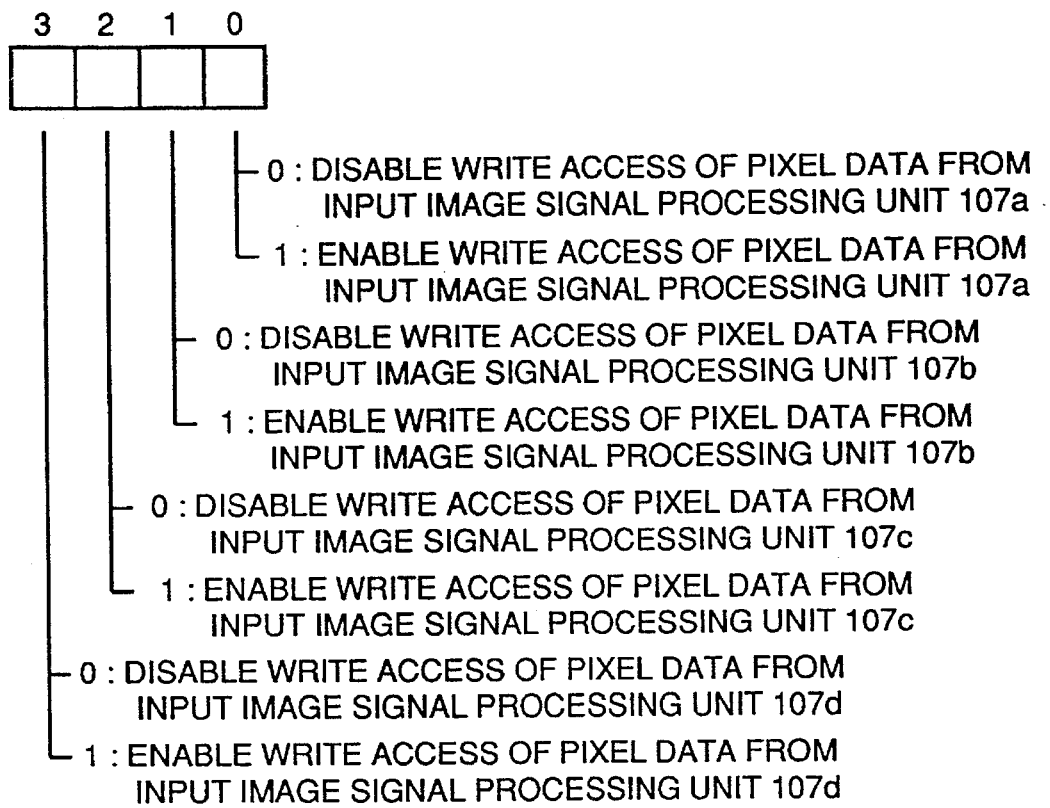
FIG. 22 is a diagram showing the bit format of control data in the system according to the second embodiment.

FIG. 22 shows the bit format of control data stored in the output image control data memory 110, and control data output onto the output image control data bus 111. Four bits of the data respectively correspond to the four input image processing units (107a to 107d). When each bit is "0", it indicates that a write access of pixel data output from the corresponding input image signal processing unit is disabled; when each bit is "1", it indicates a write access is enabled. Needless to say, when the four bits are all "1"s, they indicate that write accesses of pixel data from all the input image signal processing units (107a to 107d) are enabled for the corresponding pixel (word); when the four bits are all "0"s, they indicate that write accesses of pixel data from all the input image signal processing units (107a to 107d) are disabled for the corresponding pixel (word).

Figure 23:
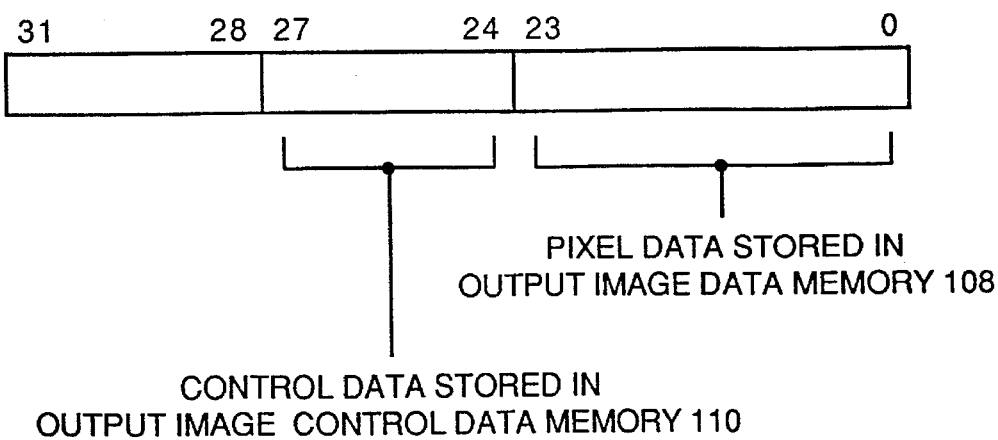
FIG. 23 is a diagram showing the bit format of data read out from an output image data memory 8 and an output image control data memory 10 by the CPU 1.

FIG. 23 shows the bit format of data read out by the CPU 101 from the output image data memory 108 and the output image control data memory 110 via the CPU data bus 104. As shown in FIG. 23, pixel data stored in the output image data memory 108 is assigned to lower 24 bits of the data, and control data stored in the output image control data memory 110 is assigned to four bits "27" to "24". Note that the bit format of the control data assigned to four bits "27" to "24" is the same as that shown in FIG. 22.

Figure 24:
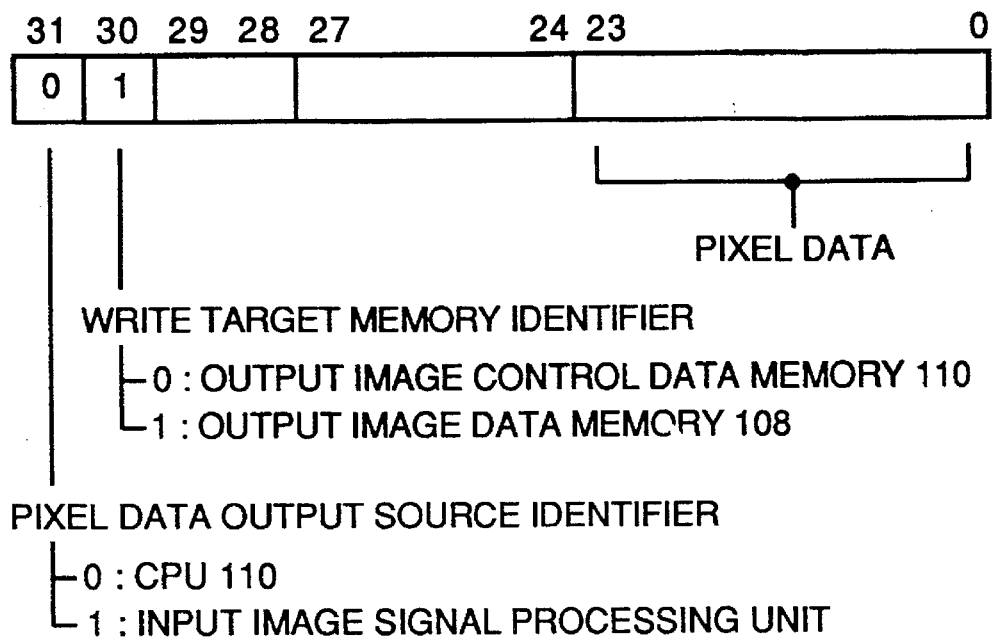
FIGS. 24 and 25 are diagrams showing the bit formats of data output onto the CPU data bus.

FIG. 24 shows the bit format of data to be output onto the CPU data bus 104 when the CPU 101 writes pixel data in the output image memory 108. Pixel data to be stored in the output image data memory 108 is assigned to the lower 24 bits of the data. A flag bit indicating whether data is output onto the CPU data bus 104 from the CPU 101 or the input image signal processing units 107a to 107d is assigned to bit "31". In an example shown in FIG. 24, "0" is set in bit "31", and it indicates that the data is output from the CPU 101. A flag bit for identifying a write mode to the output image data memory 108 or the output image control data memory 110 is assigned to bit "30". In FIG. 24, "1" is set in bit "30", and it indicates the write mode to the output image data memory 108.

Figure 25:
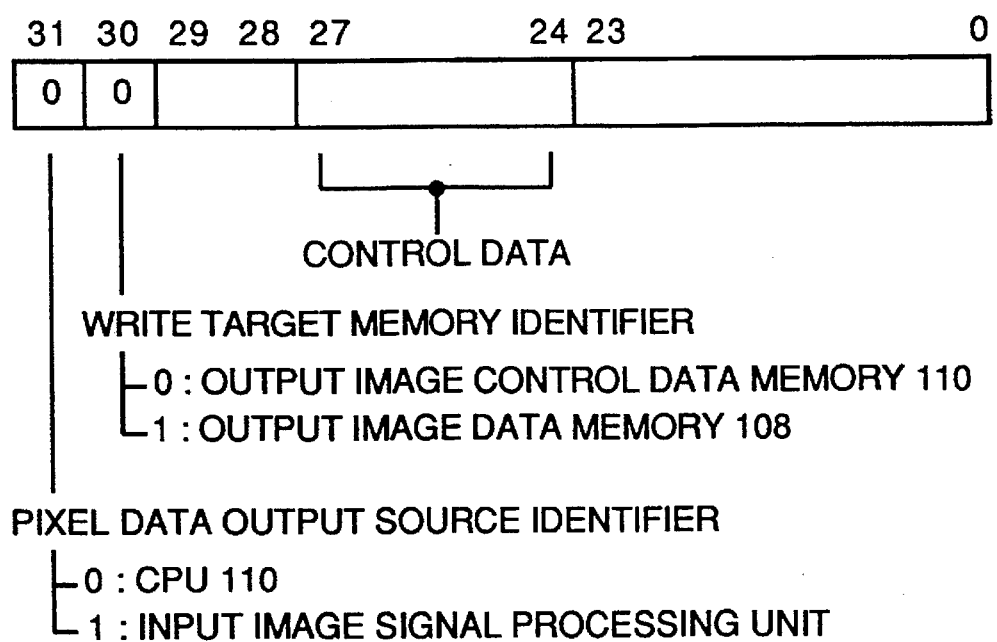

FIG. 25 shows the bit format of data output onto the CPU data bus 104 when the CPU 101 writes control data in the output image control data memory 110. In FIG. 25, control data to be written in the output image control data memory 110 is assigned to the four bits "24" to "27". A flag bit for identifying whether data is output onto the CPU data bus 104 from the CPU 101 or the input image signal processing units 107a to 107d is assigned to bit "31". In FIG. 25, "0" is set in bit "31", and it indicates that the data is output from the CPU 101. A flag bit for identifying a write mode to the output image data memory 108 or the output image control data memory 110 is assigned to bit "30". In FIG. 25, since "0" is set in bit "30", it indicates the write mode of control data to the output image control data memory 110.

Figure 26:
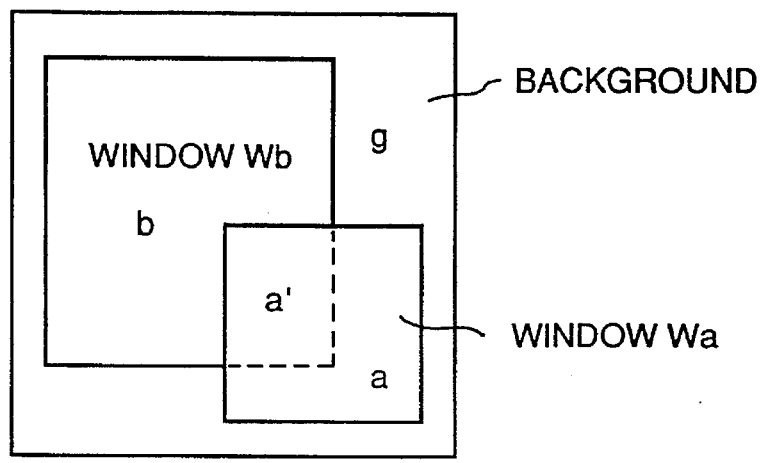
FIG. 26 is a diagram showing a divisional display example of a screen in the image processing system according to the second embodiment.

FIG. 26 is a diagram showing a divisional display example on the screen of the image display apparatus (not shown) in the system of this embodiment. In FIG. 26, display regions a and a' constitute a window Wa, and an output image generated by the input image signal processing unit 107a (FIG. 20) is displayed on the window Wa. On the other hand, a display region b corresponds to a window Wb, and an output image generated by the input image signal processing unit 107b is displayed on the window Wb. Furthermore, a display region g corresponds to a background frame, and an image pattern based on pixel data written in advance by the CPU 101 is displayed.

In the example shown in FIG. 26, the active window is the window Wa, and the display region of the window Wa can be entirely seen. On the other hand, the lower right portion of the display region of the window Wb is concealed under the window Wa. That is, in FIG. 26, the display region a' is a portion of the window Wa, which overlaps the window Wb.

Figure 27:
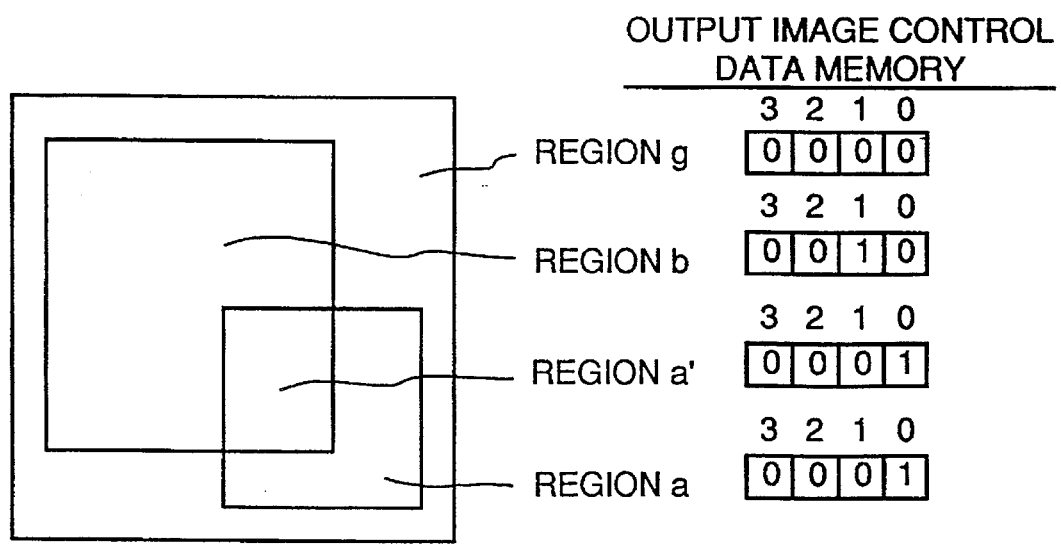
FIG. 27 is a diagram showing the content of the output image control data memory 10 corresponding to display regions in the divisional display example shown in FIG. 26.

FIG. 27 shows the contents of the output image control data memory 110, which respectively correspond to the four display regions (a, a', b, and g) in the divisional display example shown in FIG. 26. The display region g corresponds to the background frame, and disables write accesses of pixel data from the input image signal processing units (107a to 107d). Therefore, the 4-bit content of the output image control data memory 110 is all "0"s. The display region a is a portion on which an output image generated by the input image signal processing unit 107a is displayed, and enables a write access of pixel data from only the input image processing unit 107a. Therefore, the content of the output image control data memory 110 is "0001", i.e., "1" is set in only the bit (bit "0") corresponding to the input image processing unit 107a.

The display region b is a portion on which an output image generated by the input image signal processing unit 107b is displayed, and enables a write access of pixel data from only the input image processing unit 107b. Therefore, the content of the output image control data memory 110 is "0010", i.e., "1" is set in only the bit (bit "1") corresponding to the input image signal processing unit 107b. The display region a' is a portion where the output image generated by the input image signal processing unit 107a is displayed to overlap the output image generated by the input image processing unit 107b, and consequently enables a write access of pixel data from only the input image signal processing unit 107a. Therefore, the content of the output image control data memory 110 is "0001", i.e., "1" is set in the bit corresponding to the input image signal processing unit 107a like in the display region a.

Figure 28:
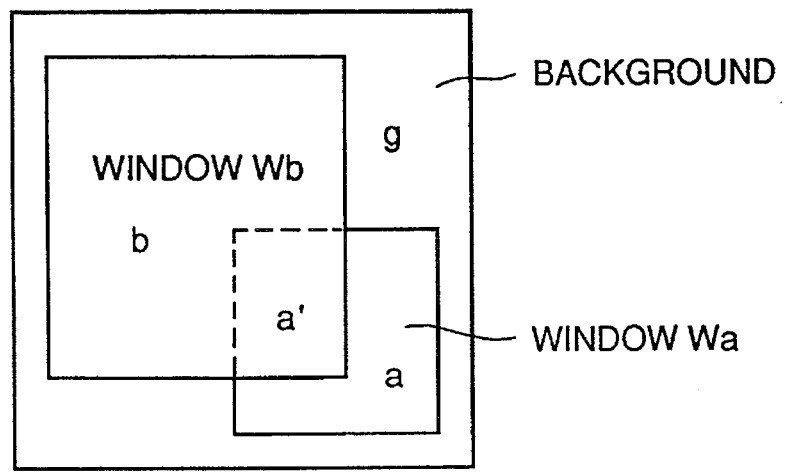
FIG. 28 is a diagram showing another divisional display example of the screen in the image processing system.

FIG. 28 shows another divisional display example on the screen of the image display apparatus in the system according to this embodiment. In FIG. 28, a display region a constitutes a window Wa, and an output image generated by the input image signal processing unit 107a is displayed on the window Wa. On the other hand, display regions a' and b constitute a window Wb, and an output image generated by the input image signal processing unit 107b is displayed on the window Wb. Furthermore, a display region g is a background frame, and an image pattern based on pixel data written in advance by the CPU 101 is displayed.

In this example, the active window is the window Wb, and the display region of the window Wb can be entirely seen. In contrast to this, the upper left portion of the display region of the window Wa is concealed under the window Wb. More specifically, the display region a' is a portion of the window Wb, which overlaps the window Wa.

Figure 29:
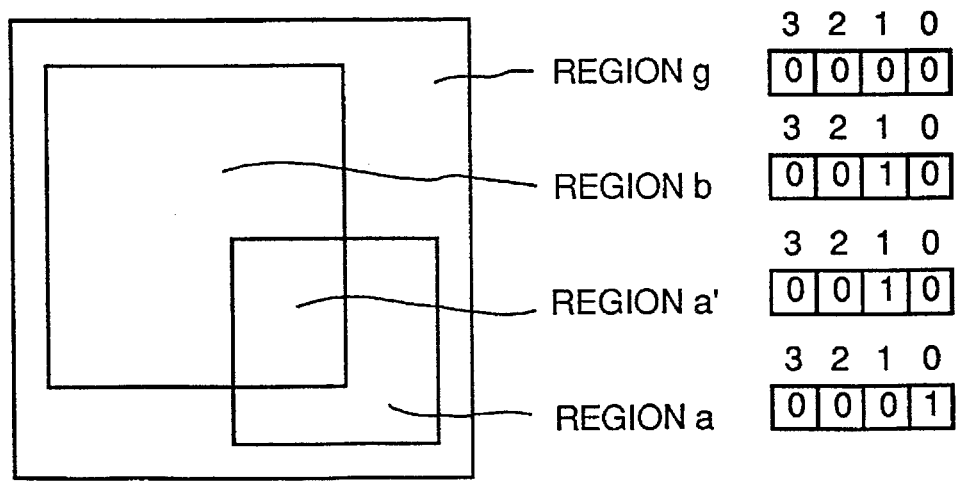
FIG. 29 is a diagram showing the content of the output image control data memory 10 corresponding to display regions in the divisional display example shown in FIG. 28.

FIG. 29 shows the contents of the output image control data memory 110, which respectively correspond to the four display regions (a, a', b, and g) in the divisional display example shown in FIG. 28. A difference from the divisional display example shown in FIG. 27 is only in the display region a'. The display region a' is a portion on which the output image generated by the input image signal processing unit 107*b* is displayed to overlap the output image generated by the input image signal processing unit 107*a*, and consequently enables a write access of pixel data from only the input image signal processing unit 107*b*. Therefore, the content of the output image control data memory 110 is "0010", i.e., "1" is set in only the bit corresponding to the input image signal processing unit 107*b* in the display region b.

Control in the image processing system of this embodiment will be described below.

Figure 30:
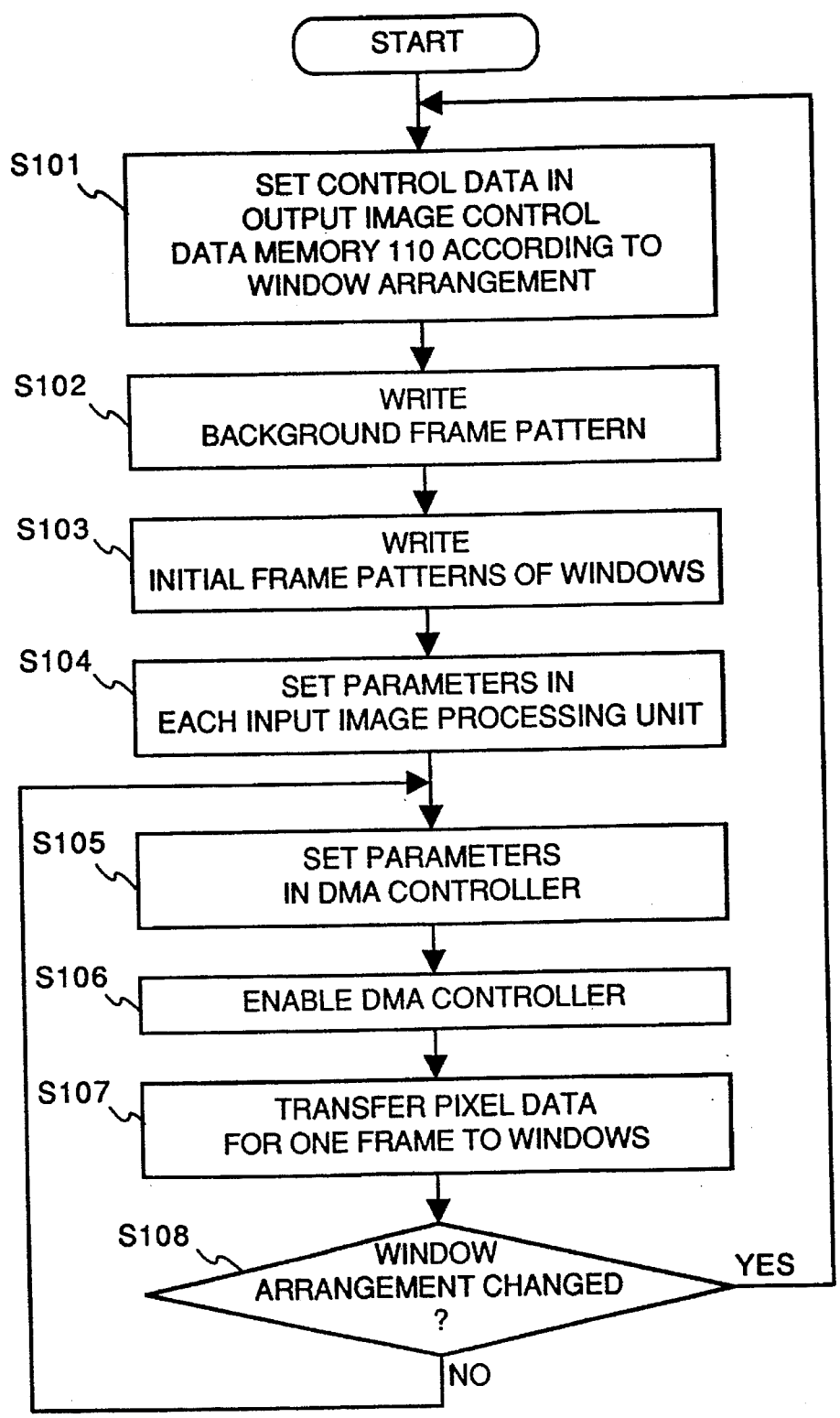
FIG. 30 is a flow chart showing control in the CPU 1 and a DMA controller 2 in the image processing system according to the second embodiment.

FIG. 30 is a flow chart showing a control sequence in the CPU 101 and the DMA controller 102 in the image processing system of this embodiment. Note that a control program is stored in a memory 101*a* in the CPU 101, and is executed. The program may be stored in another memory. In the following description, a case will be exemplified below wherein the divisional display operation on the screen of the image display apparatus shown in FIG. 26 is executed, and thereafter, the divisional display operation on the screen of the image display apparatus shown in FIG. 28 is executed.

In step S101 in FIG. 30, the CPU 101 writes different 4-bit control data in units of display regions in all the words on the output image control data memory 110 corresponding to all of the pixels constituting an output image, as shown in FIG. 27. When the control data is written, the format of data to be output from the CPU 101 onto the CPU data bus 104 is that shown in FIG. 25.

More specifically, as shown in FIG. 25, control data to be written in the output image control data memory 110 is set in four bits "24" to "27" in data to be output from the CPU 101. Since bit "31" is the flag bit for identifying whether data output onto the CPU data bus 104 is output from the CPU 101 or the input image signal processing units 107*a* to 107*d*, "0" is set in bit "31" in this case to indicate that the data is output from the CPU 101. Since bit "30" is the flag bit for identifying the write mode to the output image data memory 108 or the output image control data memory 110, "0" is set in bit "30" in this case to indicate the write mode to the output image control data memory 110.

In this manner, the CPU 101 designates in units of pixels constituting an output image, i.e., in units of words on the output image data memory 108, whether or not to enable a write access of pixel data from each of the four input image signal processing units (107*a* to 107*d*) to the output image data memory 108.

In step S102, the CPU 101 writes pixel data in words on the output image data memory 108, which words correspond to the display region g (FIG. 26), so as to display a background frame pattern. The data format of data output from the CPU 101 onto the CPU data bus 104 when the pixel data of the background frame pattern is written, is that shown in FIG. 24.

As shown in FIG. 24, pixel data to be written in the output image data memory 108 is set in the lower 24 bits of data output from the CPU 101. As described above, since bit "31" is the flag bit for identifying whether data output onto the CPU data bus 104 is output from the CPU 101 or the input image signal processing unit 107*a* to 107*d*, "0" is set in bit "31" in this case to indicate that the data is output from the CPU 101. Since bit "30" is the flag bit for identifying the write mode to the output image data memory 108 or the output image control data memory 110, "1" is set in bit "30" in this case to indicate the write mode of pixel data to the output image data memory 108.

Since the CPU 101 has already set the 4-bit content of the output image control data memory 110 to be all "0"s in step S101, pixel data generated by none of the input image signal processing units (107*a* to 107*d*) can be written in the display region g. Therefore, the background frame pattern written in the display region g by the CPU 101 in step S102 is preserved on the output image data memory 108, and is kept displayed on the screen of the image display apparatus unless the window arrangement shown in FIG. 26 is changed.

The CPU 101 writes "solid black" pixel data (a 24-bit pattern of all "0"s) in words on the output image data memory 108, which words correspond to the display regions a and a' constituting the window Wa (FIG. 26), so as to display an initial frame pattern in step S103. When the pixel data of the initial frame pattern of the window Wa are written, the format of data to be output from the CPU 101 onto the CPU data bus 104 is that shown in FIG. 24.

Since the CPU 101 has already sets "0001" in the content of the output image control data memory 110 in correspondence with the display regions a and a' in step S101, only pixel data generated by the input image signal processing unit 107*a* can be written in the display regions a and a'. However, when the pixel data of the initial frame pattern of the window Wa are written, the output image memory control unit 112 confirms based on data "0" and "1" respectively assigned to bits "31" and "30" of data to be output from the CPU 101 onto the CPU data bus 104 that the CPU 101 is making a write access of pixel data to the output image data memory 108, and allows the write access of pixel data by the CPU 101 independently of control information in the output image control data memory 110.

Similarly, the CPU 101 writes "solid black" pixel data (a 24-bit pattern of all "0"s) in words on the output image data memory 108, which words correspond to the display region b constituting the window Wb (FIG. 26), so as to display an initial frame pattern in step S103.

In this manner, with the processing in steps S101 to S103, the CPU 101 sets control data in the output image control data memory 110 on the basis of the window arrangement shown in FIG. 26, writes the background frame pattern in the region which is not included in any windows, and writes the initial frame patterns in the corresponding windows.

In step S104, the CPU 101 sets the extraction range and the enlargement/reduction magnification of an input image in the input image signal processing unit 107*a* to prepare for causing the unit 107*a* to output pixel data for one frame in turn. Similarly, the CPU 101 sets the extraction range and the enlargement/reduction magnification of an input image in the input image signal processing unit 107*b* to prepare for causing the unit 107*b* to output pixel data for one frame in turn.

The CPU 101 then sets parameters such as a transfer source address, a transfer destination address, the number of words to be transferred, and the like in one channel of the DMA controller 102 in step S105 so as to regularly transfer pixel data sequentially output from the input image signal processing unit 107*a* to the rectangular portions of the display regions a and a' constituting the window Wa (FIG. 26). In this manner, the CPU 101 prepares for an output operation of pixel data from the input image signal processing unit 107*a*. Similarly, the CPU 101 sets parameters such as a transfer source address, a transfer destination address, the number of words to be transferred, and the like in another channel of the DMA controller 102 so as to regularly transfer pixel data sequentially output from the input image signal processing unit 107*b* to the rectangular portions of the display regions b and a' constituting the window Wb (FIG. 26). In this manner, the CPU 101 prepares for an output operation of pixel data from the input image signal processing unit 107*b*. In step S106, the CPU 101 enables the two channels of the DMA controller 102, which channels were initialized in step S105.

In step S107, the transfer operation of pixel data is performed by the DMA controller 102. More specifically, the input image signal processing units 107*a* and 107*b* continuously output pixel data generated from one frame of input images according to the extraction ranges and the enlargement/reduction magnifications of the input images set by the CPU 101 in step S104. The DMA controller 102 writes pixel data for one frame output from the input image signal processing units 107*a* and 107*b* in the predetermined rectangular portions on the output image data memory 108.

Upon completion of the transfer operation of pixel data for one frame from the input image signal processing units 107*a* and 107*b* to the output image data memory 108, the CPU 101 checks in step S108 if a system operator changes the window arrangement. If NO in step S108, the flow returns to step S105 to operate the DMA controller 102 to display the next frames of the windows Wa and Wb. However, if YES in step S108, the flow returns to step S101 to re-set control data in words on the output image control memory 110, which words correspond to pixels subjected to a change in window arrangement, in accordance with the new window arrangement.

A control sequence executed when it is requested in step S108 in FIG. 30 to change the window arrangement from that shown in FIG. 26 to that shown in FIG. 28 will be described below.

As described above, in the window arrangement shown in FIG. 28, the sizes and positions of the windows Wa and Wb are left unchanged, and only the overlapping state of the windows is changed as compared to the window arrangement shown in FIG. 26. In the window arrangement shown in FIG. 26, the active window is the window Wa, and a portion (display region a') of the window Wb is concealed under the window Wa. In contrast to this, in the window arrangement shown in FIG. 28, the active window is the window Wa, and a portion (display region a') of the window Wa is concealed under the window Wb.

Therefore, when the window arrangement is changed from that shown in FIG. 26 to that shown in FIG. 28, data to be displayed on the display region a' as the overlapping portion between the two windows (Wa and Wb) need only be changed from pixel data generated by the input image signal processing unit 107*a* to pixel data generated by the input image signal processing unit 107*b*.

Thus, the CPU 101 re-sets control data in words on the output image control data memory 110, which words correspond to pixels subjected to a change in window arrangement in step S101 in FIG. 30. In this case, the CPU 101 consequently rewrites control data in words on the output image control data memory 110, which words corresponds to pixels constituting the display region a'. More specifically, the CPU 101 changes the control data for the display region a' from "0001" to "0010", as shown in FIGS. 27 and 29.

In this manner, only a write access of pixel data generated by the input image signal processing unit 107*b* is enabled for the display region a' in place of pixel data generated by the input image signal processing unit 107*a*. Thereafter, the CPU 101 executes control in steps S102 to S107 to obtain an output image having the window arrangement shown in FIG. 28.

A control sequence in the output image memory control unit 112 and the pixel data write discrimination unit 119 in the image processing system of this embodiment will be described below with reference to the flow chart shown in FIG. 31.

Figure 31:
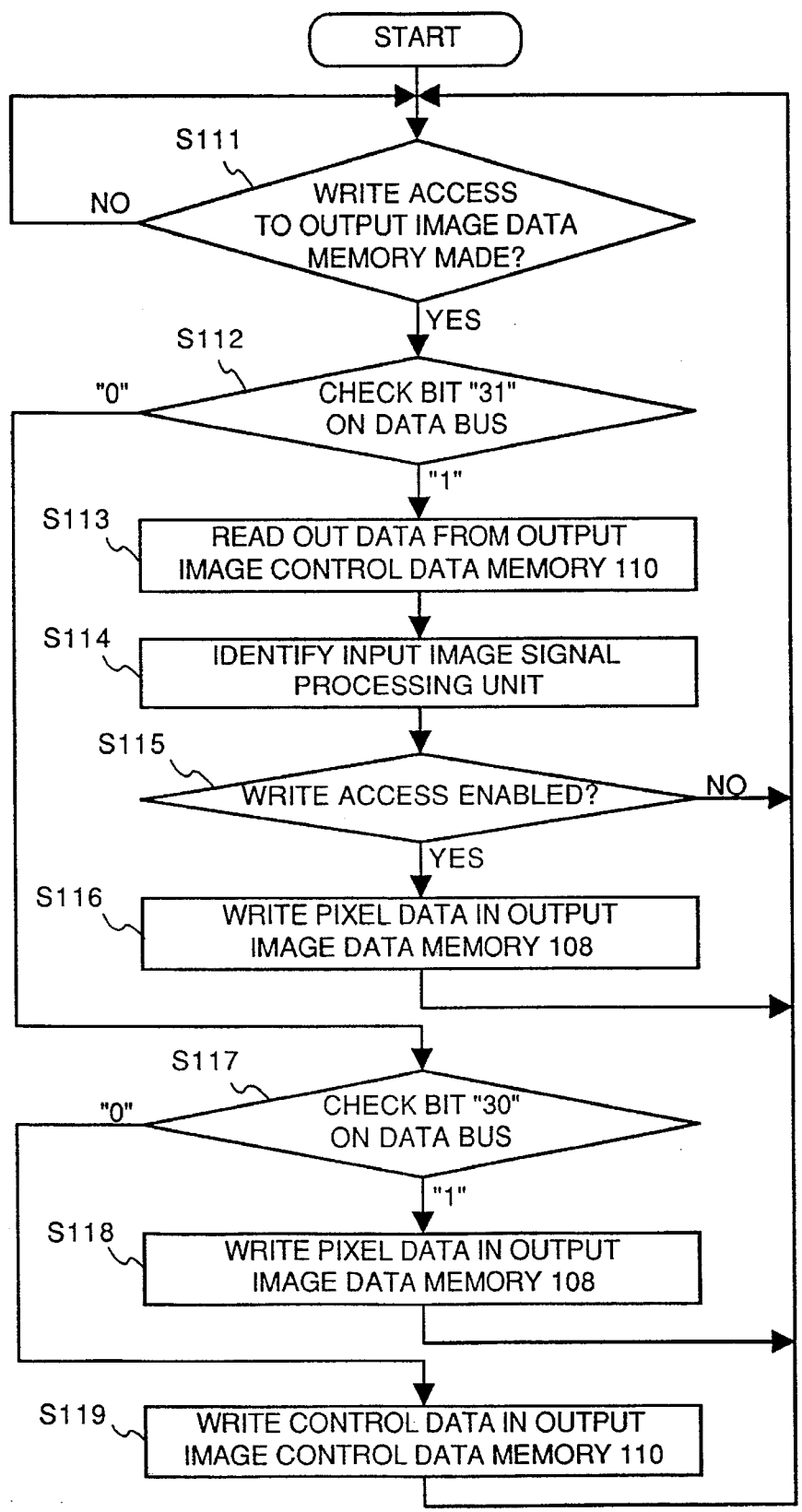
FIG. 31 is a flow chart showing control in an output image memory control unit 12 and a pixel data write discrimination unit 19 in the image processing system according to the second embodiment.

In step S111 in FIG. 31, the output image memory control unit 112 waits for execution of a write access to the output image data memory 108 or the output image control data memory 110 by the CPU 101 or the DMA controller 102. The write access of data to the output image data memory 108 or the output image control data memory 110 can be detected from the facts that an address corresponding to the memory is output onto the CPU address bus 103, and that the control signal indicating a write access on the CPU control bus 105 is set in an active state.

If a write access of data to the memory by the CPU 101 or the DMA controller 102 is detected in step S111, the flow advances to step S112, and it is identified based on bit "31" in data output onto the CPU data bus 104 if the output source of pixel data is the CPU 101 or the input image signal processing units 107*a* to 107*d*. More specifically, as shown in FIGS. 21, 24, and 25, when the CPU 101 writes pixel or control data, "0" is set in bit "31", and when the input image signal processing units 107*a* to 107*d* write pixel data, "1" is set in bit "31". For this reason, the output image memory control unit 112 can easily identify the pixel data output source on the basis of this bit.

If it is determined in step S112 that the input image signal processing units 107*a* to 107*d* are pixel data output sources (bit "31"="1"), the flow advances to step S113. In step S113, the output image memory control unit 112 reads out control data from words on the output image control data memory 110, which words correspond to words on the output image data memory 108 as the write destination of pixel data. The readout control data represents whether or not a write access of each of the input image signal processing units (107*a* to 107*d*) is enabled for the corresponding pixel (word), as shown in FIG. 22.

In step S114, the pixel data write discrimination unit 119 identifies the input image signal processing units (107*a* to 107*d*) on the basis of bits "29" and "28" of data output onto the CPU data bus 104. More specifically, as shown in FIG. 21, when the input image signal processing units (107*a* to 107*d*) write pixel data, a 2-bit encoded input image signal identifier is assigned to bits "29" and "28" of output data. Therefore, the pixel data write discrimination unit 119 can easily identify which of the input image signal processing units (107*a* to 107*d*) is currently outputting pixel data.

In step S115, the pixel data write discrimination unit 119 checks if the write access of the input image signal processing unit, which is currently outputting pixel data, is enabled on the target words on the output image data memory 108.

In this case, it is checked based on the control data read out onto the output image control data bus 111 in step S113 and the identification result in step S114 whether or not the write access of the input image signal processing unit, which is currently outputting pixel data, is enabled on target words of the output image memory 108.

If it is determined in step S115 that the write access is enabled, the flow advances to step S116, and pixel data output from the input image signal processing units 107*a* to 107*d* are written in the target words of the output image data memory 108. In this manner, since the transfer operation of pixel data from the input image signal processing units 107*a* to 107*d* onto the output image data memory 108 by the DMA controller 102 is completed, the flow returns to step S111, and the control waits for the next write access to the output image memory.

On the other hand, if it is determined in step S115 that the write access is disabled, the current transfer operation of pixel data from the input image signal processing units 107*a* to 107*d* onto the output image data memory 108 by the DMA controller 102 is forcibly terminated, and the flow returns to step S111 to wait for the next write access to the output image memory.

If it is determined in step S112 that the pixel data output source is the CPU 101 (bit "31"="0"), the flow advances to step S117. The output image memory control unit 112 identifies based on bit "30" of data output onto the CPU data bus 104 whether the target memory of the write access of the CPU 101 is the output image data memory 108 or the output image control data memory 110. More specifically, as shown in FIGS. 24 and 25, when the CPU 101 writes pixel data in the output image data memory 108, "1" is set in bit "30"; when the CPU 101 writes control data in the output image control data memory 110, "0" is set in bit "30". For this reason, the output image memory control unit 112 can easily identify the target image memory of the write access.

If it is determined in step S117 that the CPU 110 writes pixel data in the output image data memory 108 (bit "30"="1"), the flow advances to step S118, and the output image memory control unit 112 actually writes pixel data output from the CPU 101 on target words of the output image data memory 108. In this manner, since the write access of pixel data on the output image data memory 108 by the CPU 101 is completed, the flow returns to step S111, and the control waits for the next write access to the output image memory.

However, if it is identified in step S117 that the CPU 101 writes control data in the output image control data memory 110 (bit "30"="0"), the output image memory control unit 112 actually writes control data output from the CPU 101 in target words on the output image control data memory 110 in step S119. With this processing, since the write access of control data onto the output image control data memory 110 by the CPU 101 is completed, the flow returns to step S111, and the control waits for the next write access to the output image memory.

In this manner, since control information for realizing a hierarchical display of a plurality of windows is controlled by hardware, i.e., an image memory in units of pixels constituting an output image, the load of the system associated with display control on the OS can be reduced, and the display speed can be increased.

In addition, high-speed development of an initial frame pattern of a window, and a superimpose operation of an image onto a dynamic image can be realized.

As many apparently widely different embodiments of the present invention can be made without departing from the spirit and scope thereof, it is to be understood that the invention is not limited to the specific embodiments thereof except as defined in the appended claims.

What is claimed is:

1. An image processing system, which displays a plurality of portions of a plurality of images on a single screen, comprising:

first storing means for storing overlay-display data associated with the allowance/disallowance of an overlay display of the images, with respect to display positions of the images for every display pixel;

second storing means for storing selection data for selecting at least one input image signal corresponding to the display positions of the images for every display pixel;

first selection means for selecting at least a first image from the plurality of portions of the plurality of images, based on the selection data corresponding to a display position at which the overlay-display data is indicative of the allowance of the overlay display of the images;

second selection means for selecting at least a second image from the plurality of portions of the plurality of images, based on the selection data corresponding to a display position in which the overlay-display data is indicative of the disallowance of the overlay display of the images; and display instruction means for instructing to overlay-display the first image on the second image on the screen in accordance with the overlay-display data and the selection data.

2. The system according to claim 1, wherein said display instruction means has a table indicating displaying positions of pixels corresponding to an output image, and instructs a display operation in the form of bit information in units of said displaying positions of pixels.

3. The system according to claim 1, wherein the first image is a video image, and the second image is a background image which provides a background for the video image on the screen.

4. An image processing system, which displays a plurality of portions of a plurality of images on a signal screen, comprising:

first storing means for storing overly-display data associated with allowance/disallowance of an overlay display of the images, with respect to display positions of the images of every display pixel;

second storing means for storing selection data for selecting at least one input image signal corresponding to the display positions of the images for every display pixel;

first selection means for selecting at least a first image from the plurality of portions of the plurality of images, based on the selection data corresponding to a display data being indicative of the allowance of the overlay display of the data;

second selection means for selecting at least a second image from the plurality of portions of the plurality of images, based on the selection data corresponding to a display data being indicative of the allowance of the overlay display of the data;

third selection means for selecting at least a third image from the plurality of portions of the plurality of images, based on the selection data corresponding to a display position in which the overlay-display data indicative of the disallowance of the overly display of the data;

means for generating a fourth image by overlapping the first image and the second image at a predetermined overlap ratio; and display instruction means for instructing to overlay-display the fourth image on the third image on the screen in accordance with the overlay-display data and the selection data.

5. The system according to claim 4, wherein said display instruction means has a table indicating displaying positions of pixels corresponding to an output image, and instructs a display operation in the form of bit information in units of said displaying positions of pixels.

6. The system according to claim 4, wherein the fourth image includes a video image, and the third image is a background image located at a background of the fourth image on the screen.

7. An image processing system, comprising:

memory means for storing data associated with a plurality of portions of a plurality of images to be displayed on a single screen;

first information generation means for generating information indicating a correspondence between a divisional display arrangement and input image signal sources for every display pixel according to the divisional display arrangement of the plurality of portions of the plurality of images on the screen;

control means for controlling an output operation of the plurality of portions of the plurality of images from said input image signal sources in accordance with the information generated by said first information generation means;

second information generation means for generating write instruction information of the plurality of portions of the plurality of images in said memory means on the basis of the divisional display arrangement of the plurality of portions of the plurality of images on the screen; and means for storing the plurality of portions of the plurality of images outputted under the control of said control means into said memory means in accordance with the write instruction information generated by said second information generation means.

8. The system according to claim 7, wherein the write instruction information of the plurality of portions of the plurality of images generated by said second information generation means includes a correspondence information between information for specifying each of pixels constituting the plurality of portions of the plurality of images and specific elements constituting said memory means.

9. The system according to claim 7, wherein the information for specifying said each of pixels is color information.

10. An image processing system, comprising:

memory means for storing data associated with a plurality of portions of a plurality of images to be displayed on a single screen;

first information generation means for generating information indicating a correspondence between a divisional display arrangement and input image signal sources for every display pixel according to the divisional display arrangement of the plurality of portions of the plurality of images on the screen;

control means for controlling an output operation of the plurality of portions of the plurality of images from said input image signal sources in accordance with the information generated by said first information generation means;

second information generation means for generating write instruction information of the plurality of portions of the plurality of images which includes a correspondence between information for specifying each of the pixels constituting the plurality of portions of the plurality of images and specific elements constituting said memory means, on the basis of the divisional display arrangement of the plurality of portions of the plurality of images on the screen; and means for storing the plurality of portions of the plurality of images outputted under the control of said control means into said memory means in accordance with the write instruction information generated by said second information generation means.

11. The system according to claim 10, wherein the information for specifying said each of pixels is color information.

12. An image processing method for displaying a plurality of portions of a plurality of images on a single screen, comprising:

generating first information indicating a correspondence between a divisional display arrangement and input image signal sources for every display pixel according to the divisional display arrangement of the plurality of portions of the plurality of images on the screen;

controlling an output operation of the plurality of portions of the plurality of images from the input image signal sources in accordance with the generated first information;

generating write instruction information of the plurality of portions of the plurality of images into a memory on the basis of the divisional display arrangement of the plurality of portions of the plurality of images on the screen; and storing the plurality of portions of the plurality of images outputted under the control in said controlling step into the memory in accordance with the generated write instruction information.

13. An image processing system, comprising:

a plurality of first storing means for storing selection data for selecting at least one input image from a plurality of portions of a plurality of images and for storing a plurality of values, which are different from each other, related to the selection data;

second storing means for storing information for selecting the selection data and for selecting one of the values related to the selection data from the plurality of first storing means, for every display pixel;

means for selecting the input image based on the information stored in said second storing means;

read-out means for reading out the value related to the selected input image, based on the information stored in said second storing means; and display control means for controlling a display of the selected input image on a display device for every unit of display pixels by performing a calculation on the selected input image based on the value read out by said read-out means.

14. The system according to claim 13, wherein the values stored in said plurality of first memory means indicate an overlap ratio.

15. The system according to claim 13, wherein said second memory means further stores selection information for selecting one of a plurality of input images, and said display control means selects an input image based upon the selection information.

16. An image processing method, comprising the steps of:

storing selection data in a first memory for selecting at least one input image from a plurality of portions of a plurality of images and a plurality of values, which are different from each other, related to the selection data;

storing selection data in a second memory for selecting one of the values related to the selection data, for every display pixel;

selecting the input image based on the information stored in said second memory;

reading out the values related to the selected input image from said first memory, based on the information stored in said second memory, and controlling a display of the selected input image on a display device for every unit of display pixels, by performing a calculation on the selected input image based on the values read out from said first memory.

17. The method according to claim 16, wherein the values stored in the first memory indicate overlap ratios.

18. The method according to claim 16, wherein the second memory further stores selection information for selecting one of a plurality of input means, and an input image is selected in said displaying step based upon the selection information.

* * * * *

UNITED STATES PATENT AND TRADEMARK OFFICE
CERTIFICATE OF CORRECTION

PATENT NO. : 5,499,327
DATED : March 12, 1996
INVENTOR(S) : Makoto Satoh

It is certified that error appears in the above-indentified patent and that said Letters Patent is hereby corrected as shown below:

ABSTRACT

```
Line 1, "In an" should read --An-- and "of this
    invention", should read --in which--.
Line 5, "this" should read --the--.
Line 9, "of" should read --from-- and "memory,
    which signal" should read --memory--.
Line 10, "region" should read --region of the
    display screen--.
```

COLUMN 10

```
Line 5, "In" should read --In the--.
```

COLUMN 16

```
Line 41, " "23" to "0" )," should read --"0" to
    "23"),--.
Line 43, "FIG. 7." should read --FIG. 6.--.
```

UNITED STATES PATENT AND TRADEMARK OFFICE
CERTIFICATE OF CORRECTION

PATENT NO. : 5,499,327
DATED : March 12, 1996
INVENTOR(S) : Makoto Satoh

It is certified that error appears in the above-indentified patent and that said Letters Patent is hereby corrected as shown below:

COLUMN 19

Line 39, "window #3," should read --window W3,--.

COLUMN 23

Line 10, "of" should be deleted.
Line 50, "107d" should read --106d--.

COLUMN 24

Line 1, "randomly write" should read --random writing of--.
Line 11, "apparatus" should read --apparatus,--.
Line 48, "monitor" should read --monitor,--

COLUMN 28

Line 33, "sets" should read --set--.

UNITED STATES PATENT AND TRADEMARK OFFICE
CERTIFICATE OF CORRECTION

PATENT NO. : 5,499,327
DATED : March 12, 1996
INVENTOR(S) : Makoto Satoh

Page 3 of 3

It is certified that error appears in the above-indentified patent and that said Letters Patent is hereby corrected as shown below:

<u>COLUMN 30</u>

```
Line 4, "corresponds" should read --correspond--.
Line 67, "on" (second occurrence) should read --of--.
```

<u>COLUMN 32</u>

```
Line 63, "overly" should read --overlay--.
```

Signed and Sealed this

Third Day of September, 1996

Attest:

BRUCE LEHMAN

*Attesting Officer*          *Commissioner of Patents and Trademarks*